US006758972B2

(12) United States Patent
Vriens et al.

(10) Patent No.: US 6,758,972 B2
(45) Date of Patent: Jul. 6, 2004

(54) METHOD AND SYSTEM FOR SUSTAINABLE TREATMENT OF MUNICIPAL AND INDUSTRIAL WASTE WATER

(76) Inventors: Luc Vriens, Panoramalaan 16, B-3110 Rotselaar (BE); Ron Gerards, Bankstraat 80, B-3000 Leuven (BE)

( * ) Notice: Subject to any disclaimer, the term of this patent is extended or adjusted under 35 U.S.C. 154(b) by 18 days.

(21) Appl. No.: 10/220,549

(22) PCT Filed: Mar. 2, 2001

(86) PCT No.: PCT/BE01/00034
§ 371 (c)(1),
(2), (4) Date: Aug. 30, 2002

(87) PCT Pub. No.: WO01/64590
PCT Pub. Date: Sep. 7, 2001

(65) Prior Publication Data
US 2003/0038080 A1 Feb. 27, 2003

(30) Foreign Application Priority Data
Mar. 2, 2000 (GB) .............................. 0004921

(51) Int. Cl.[7] ................................ C02F 3/30
(52) U.S. Cl. .................. 210/605; 210/630; 210/259; 210/260
(58) Field of Search ................ 210/605, 621, 210/622, 623, 630, 252, 259, 260, 903, 906

(56) References Cited

U.S. PATENT DOCUMENTS 4,315,821 A * 2/1982 Climenhage ............... 210/605
5,013,441 A * 5/1991 Goronszy ................... 210/605
5,354,471 A   10/1994 Timpany
5,792,355 A * 8/1998 Desjardins .................. 210/605
5,902,484 A   5/1999 Timpany
6,096,214 A * 8/2000 Ripley ........................ 210/603
6,444,125 B2 * 9/2002 Han ............................ 210/605

FOREIGN PATENT DOCUMENTS

DE   31 47 927 A1   6/1983
FR   2 550 522 A1   2/1985

* cited by examiner

Primary Examiner—Fred G. Prince
(74) Attorney, Agent, or Firm—Barnes & Thornburg LLP

(57) ABSTRACT

The present invention relates to a method for treatment of wastewater. More particularly, the methods of the present invention are designed for the biological removal from wastewater of contamination in the form of insoluble suspended solids and soluble and insoluble organic and inorganic material, including nitrogen and phosphorus nutrients. A wastewater treatment process is described, which process is a hybrid continuous flow, cyclic operating, substantially constant level, activated sludge process with a symmetric functional cycle. In this functional cycle each compartment of a reactor is subsequently in a different functional phases, which functional phases are continuously separated: phase 1, phase 2, phase 3, phase 4, phase 1, phase 2, phase 3, phase 4, etc. . . . The symmetric functional cycle allows for symmetric (equal) influent distribution and therefore symmetric sludge and oxygen demand distribution.

15 Claims, 32 Drawing Sheets

METHOD AND SYSTEM FOR SUSTAINABLE TREATMENT OF MUNICIPAL AND INDUSTRIAL WASTE WATER

TECHNICAL FIELD OF THE INVENTION

The present invention relates to methods and devices for treatment of wastewater. More particularly, the methods of the present invention are designed for the biological removal from wastewater of contamination in the from of insoluble suspended solids and soluble and insoluble organic and inorganic material including nitrogen and phosphorus nutrients.

BACKGROUND OF THE INVENTION

Wastewater which is produced every day by domestic activities (wastewater from bath, kitchen, shower, toilet, washing-machine, etc.) and in industry, must be purified for both organic materials and inorganic materials such as nitrogen compounds and phosphorus nutrients, before being discharged in surface waters or being treated for reuse (irrigation, cleaning or process water).

Wastewater treatment consists of applying known technology to improve or upgrade the quality of a wastewater. Usually wastewater treatment will involve collecting the wastewater in a central, segregated location (the Wastewater Treatment Plant) and subjecting the wastewater to various treatment processes. Most often, since large volumes of wastewater are involved, treatment processes are carried out on continuously flowing wastewaters (continuous flow or "open" systems) rather than as "batch" or a series of periodic treatment processes in which treatment is carried out on parcels or "batches" of wastewaters. While most wastewater treatment processes are continuous flow, certain operations, such as vacuum filtration, involving as it does, storage of sludge, the addition of chemicals, filtration and removal or disposal of the treated sludge, are routinely handled as periodic batch operations.

Wastewater treatment, however, can also be categorised by the nature of the treatment process operation being used; for example, physical, chemical or biological. A complete treatment system may consist of the application of a number of physical, chemical and biological processes to the wastewater. The present invention relates to biological wastewater treatment. Biological treatment methods use micro-organisms, mostly bacteria, in the biochemical decomposition of wastewaters to stable end products. More micro-organisms, or sludges, are formed and a portion of the waste is converted to carbon dioxide, water and other end products. Generally, biological treatment methods can be divided into aerobic and anaerobic methods, based on presence of dissolved oxygen.

Basics of biological wastewater treatment are given hereinafter.

Aerobic biological wastewater treatment may be carried out in an aerobic activated sludge reactor, where activated sludge (flocculated aggregates of micro-organisms) is aerated and fed with wastewater. The activated sludge is a microbial mass which has increased biological activity through aeration in a vessel.

The suspended and dissolved organic matter of the wastewater is in a first enzymatically induced step, adsorbed and absorbed by the micro-organisms in the sludge flocks (the accumulation process).

The accumulated or stored substrates are then oxidised in carbon dioxide and water, while producing energy (the dissimilation process).

The generated energy is used to take up the substrates and generate new micro-organisms (the assimilation and regeneration processes).

In a clarifier, the mixture of the sludge and treated wastewater is separated by gravitational sedimentation in a bottom sludge blanket and supernatant effluent. Depending on the technology, the bottom sludge is recycled to the aeration reactor or re-activated later in the same compartment.

Next to organic matter, wastewater usually also contains nitrogen and phosphorus compounds. These compounds exist under different forms, like particulate or dissolved organic bound nitrogen and phosphorus, and dissolved ammonia, nitrates, nitrites and ortho-phosphates.

European and world-wide legislative bodies have issued strict discharge limits for nitrogen (<10 mg N/l) and phosphorus (<1–2 mg P/l).

For this reason enhanced biological nitrogen and phosphorus removal is often incorporated in biological wastewater treatment processes.

To activate biological nutrient removal in wastewater treatment plants, specific conditions should be applied to the activated sludge micro-organisms. A distinction can be made between assimilative and dissimilative nutrient removal.

Hydrolysis of organic bound nitrogen or phosphorus to dissolved ammonia and ortho-phosphates is a process that is important to make the nitrogen and phosphorus available to the micro-organisms.

During the assimilation process the micro-organisms incorporate nitrogen and phosphorus in new cell material according to a specific ratio based on an ideal cell material composition. This ratio is estimated to be approximately 100:5:1 as BOD:N:P. This is a rather conservative value and depending on the F/M ratio, a measure of food provided to micro-organisms in an aeration tank, and thus depending on sludge loading. BOD is the Biological Oxygen Demand, the quantity of oxygen necessary for breakdown of readily decomposable organic matter added to water (or a liquid mix such as liquid manure).

If the nutrient content of the wastewater is low, then nutrients should be added to obtain a good working activated sludge. Addition of nutrients is often necessary when treating high organically loaded wastewaters from the food industry.

In general the assimilative nutrient removal is depending on the sludge production and thus on the organic loading of the plant. Since sludge production is normally kept as low as possible, the assimilative removal capacity is rather limited.

The specific conditions for dissimilative enhanced biological nitrogen and phosphorus removal processes are different. Therefore these processes are described separately.

The dissimilative nitrogen removal is a process that is carried out by a specific group of bacteria in the activated sludge during different environmental conditions or states.

A first step in the dissimilative nitrogen removal is called nitrification or ammonia oxidation, carried out by autotrophic nitrifying organisms during aerobic conditions. The nitrifying micro-organisms in the activated sludge oxidise ammonia to nitrite and nitrate. This process uses oxygen, according to the following reaction (nitrification reaction):

ammonium-N+oxygen→nitrate-N+water+protons+energy

A second step in the dissimilative nitrogen removal is called denitrification, carried out by facultative anaerobic heterotrophic bacteria. During denitrification the nitrate is transformed via nitrite and several intermediates to atmospheric nitrogen. The denitrification reactions are as follows:

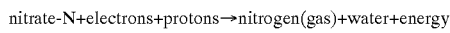

nitrate-N+electrons+protons→nitrogen(gas)+water+energy

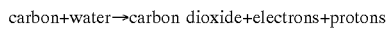

carbon+water→carbon dioxide+electrons+protons

In this process, nitrates are used for the oxidation of carbon, and this process provides the energy for cell growth.

Denitrification is achieved under low or zero dissolved oxygen concentrations (anoxic phase). As carbon source for denitrification, raw wastewater should be used to the maximum.

Oxygen and alkalinity are partly recovered during this process.

Important control parameters for dissimilative nitrogen removal are the aerobic and anoxic retention time of the bacteria, the availability of rapidly biodegradable organic substrates (volatile fatty acids), pH and temperature and especially the overall sludge retention time in the system (typically >10 days at 15° C.).

Biological phosphorus (BioP) removal is achieved in a sequence of anaerobiosis (the presence of life in the absence of air or free oxygen) and aerobiosis (the presence of life in presence of air or free oxygen).

Strictly aerobic organisms can survive in anaerobic conditions on short chain fatty acids. These acids are taken up using energy from hydrolysis of polyP (polyphosphate). Finally polyP is hydrolysed, ortho-phosphates are released in the liquid and an internal C-source (carbon source) is formed.

Oxidation of the internal C-source in the subsequent aerobic sequence directly provides energy for p-uptake, polyP-storage and cell-growth. To obtain a net P-removal the uptake should be higher than the initial release.

Important control parameters for BioP removal are the aerobic and anaerobic retention time of the bacteria, the availability of rapidly biodegradable organic substrates (volatile fatty acids), the nitrate concentration (as low as possible), pH and temperature and especially the overall sludge retention time in the system (typically >5 days).

Anaerobic digestion is a biological treatment process, where organic compounds are anaerobically transferred into methane gas. It is depending on complex interactions between several involved groups of micro-organisms, which interactions take place in anaerobic sludge granules that are normally present or selected in an up flow anaerobic sludge blanket system.

First the complex particles and dissolved polymers are hydrolysed to simpler soluble molecules. These products are then used by fermentative micro-organisms, to produce mainly volatile fatty acids (VFA), aldehydes, alcohols, carbon dioxide and hydrogen. In this acidogenesis phase (phenomenon by which organic matter is transformed into organic acids), partial removal of suspended solids can be carried out by pre-sedimentation.

In the subsequent acetogenesis phase (the second stage of decomposition of organic materials, whereby molecules are acted upon by anaerobic bacteria to produce volatile organic acids, carbon dioxide and hydrogen), most of the fermentation products must be further degraded by the acetogens (also known as acetic acid bacteria) to yield acetate, $H_2$ and may be $CO_2$.

The acetogens grow close to methanogenic bacteria (organisms that generate methane as a metabolic end product), because they can only grow at very low hydrogen concentrations.

The final step of the anaerobic digestion is carried out by the methanogenic bacteria and is the formation of methane gas from acetate and from hydrogen and carbon oxide. The gas formation is important for mixing purposes of the sludge blanket and the wastewater.

Important control parameters for anaerobic digestion are temperature (mesophilic bacteria, 30° C.), pH (alkalinity recovery by effluent recycle) and sludge retention time. Sludge retention is high because of the low growth rate of the methanogenic bacteria population. The acidogenic bacteria, however, have a much higher growth rate, which is the reason that a two-stage process may be applied. Also pre-sedimentation during hydrolysis is especially important to avoid too low sludge retention times.

Conventional activated sludge wastewater treatment technology in its most generic form comprises an activated sludge reactor connected with a separate sedimentation tank. There are thus different dedicated tanks for reaction and sedimentation, which are separated in place.

In the activated sludge reactor the Mixed Liquor Suspended Solids (MLSS), the total solids (organic and inorganic) in the reactor, is aerated and fed with wastewater. Many different aeration systems can be used, depending on the type of wastewater, the size of the wastewater treatment system and the necessary oxygen transfer efficiency.

The sludge-water mixture flows under gravity to the sedimentation tank, where settlement of the sludge flocks separates the micro-organisms from the treated water. The clarified supernatant layer or effluent is discharged via a weir system. A sludge blanket at the bottom part of the sedimentation tank, a distance under the surface of the final clarifier where settle sludge is lying, is slowly pushed to a suction pit of sludge recycle and sludge waste pumps by a slowly turning raking system. The sludge recycle pump transports the sludge back to the activated sludge reactor. The excess sludge is wasted to a sludge treatment unit to maintain a constant sludge concentration in the system.

In cases where the nutrients nitrogen and phosphorus have to be removed from the wastewater besides the organic content, extra reactors to introduce anoxic and anaerobic circumstances are needed. The introduction of these extra reactors implies also recirculation of sludge from the anoxic to the anaerobic reactor or from the aerobic to the anoxic reactor, depending on the chosen system.

Other alternatives for the introduction of nutrient removal are known as the oxidation ditch concept. The oxidation ditch is a modified form of the activated sludge process. The ditch consists of two channels placed side by side and connected at the ends to produce one continuous loop of wastewater flow, with a brush rotator assembly placed across the channel to provide aeration and circulation. In this system a continuous cycling of sludge in a closed loop takes place. There is no separation by walls in this reactor. Nutrient removal can be obtained by introducing anoxic and anaerobic zones in the loop by controlling the oxygen transfer level and influent distribution. In this way no sludge recycling devices are necessary to obtain the anoxic and anaerobic zones.

As in the compartmentalised conventional systems, sludge-effluent separation takes place in a separate sedimentation tank.

In general the design of activated sludge wastewater systems is very much depending on the type of wastewater to be treated and the client (industrial or municipal wastewater, industry or government as a client), the available space (city or country side), the area of implantation (nearby sensitive ecosystems, nearby sea, river), country economics and also origin of the design and engineering companies.

Main advantages of this conventional activated sludge wastewater system are the continuous influent and effluent flow rate and the constant water level. Main disadvantages are the separation in space of the active and sedimentation compartments, the necessary devices for sludge raking and recirculation, the mostly circular configuration of the sedimentation tanks and the rather high footprint (or surface) for this type of plants.

Batch reactor activated sludge wastewater treatment can be carried out in a single reactor or in multiple reactor set-ups. Each reactor compartment has hereby two main functions, (1) a biological treatment function (oxidation, nitrification, denitrification, and phosphorus removal) and (2) a sedimentation function (solids-liquid separation).

The absence of a separate sedimentation tank means that no recirculation pumps or screws and piping are necessary. Also no bottom-raking device is necessary.

A single reactor is operated according to a fill and draw principle (F&D), which is opposed to a reactor through which liquid flows continuously at its normal rate of flow as in the conventional activated sludge system. In a batch reactor, several phases are followed in a cyclic pattern according to a specific time interval. In general following phases can be distinguished: Fill, React, Settle, Decant (or Draw) and Idle. Excess solids can be discharged during the Settle phase. Because these subsequent phases are continuously repeated, these systems are often named as intermittent or cyclic operating systems. Reaction and sedimentation are separated in time.

When a single reactor compartment is used (F&D), influent feeding and effluent discharge are discontinuous and therefore a holding tank is necessary.

With two or more reactor compartments the wastewater treatment system may be catalogued to the sequencing batch reactor technology (SBR—biological treatment and settlement of solids are combined in one reactor). Each tank is then operated according to the same cycle of subsequent phases (Fill, etc.), but in such a non-synchronic, out of phase way that continuous influent feeding and effluent discharge are possible over the overall system.

During operation the filled reactor volume varies between top water level and bottom water level. For this reason the sequencing batch reactor systems or cyclic operating systems are collectively regarded as variable volume systems.

Main advantages of the cyclic operating F&D- or SBR- systems are the easy and compact construction without sludge raking and recirculation devices, the control in time possibilities that allows exact control of all specific phases and change in substrate gradients, resulting in microbial selection of well settling sludge. Main disadvantages of cyclic operating F&D- or SBR-systems are especially the variable volumes (level changes) and the intermittent influent feeding and effluent discharge. Overall influent and effluent flow rate may be constant when several (at least two) tanks are operated according to the same cycle of subsequent phases in a non-synchronic, out of phase way. However for each tank still intermittent feeding and discharge occurs with all its disadvantages, such as for example higher pipe diameters, pump capacities and aeration system capacities.

Therefore, both conventional activated sludge systems and cyclic operating activated sludge systems (F&D, SBR) have their advantages and disadvantages. Several attempts have been made to combine the advantages of both system types in one hybrid continuous cyclic operating system. Development of these hybrid systems, which can be generally classified as continuous cyclic operating activated sludge systems, evolved in several different directions.

The hybrid continuous cyclic operating activated sludge system can in general be described as a system with separation of reaction and sedimentation in time, while also having a continuous inflow and outflow. The known hybrid continuous cyclic operating systems can be divided into two subclasses of hybrid systems:

semi-hybrid cyclic operation systems
hybrids with asymmetric functional cycle

The semi-hybrid cyclic operation systems have more functional characteristics of the continuous conventional system than of the cyclic operating systems.

In U.S. Pat. No. 3,977,965 a system is described whereby reactions are separated in time, and whereby a dedicated sedimentation tank is provided. Two hydraulically connected compartments which are alternately fed, aerated and mixed, are described. Sludge from one of these two compartments always flows to the one dedicated sedimentation tank. Thickened sludge is recycled from the bottom of the sedimentation tank to one of the two active compartments.

In U.S. Pat. No. 5,902,484 a system is described where the active compartment(s) are dedicated compartments (for reaction only) and where only the sedimentation tank or tanks are alternated in time between sedimentation and aeration (resuspension and activation of the thickened sludge to avoid the use of sludge raking systems). The thickened sludge is recycled to the active reactor(s) for redistribution of the sludge.

Known hybrid systems with asymmetric functional cycle have reaction and sedimentation separated in time, continuous inflow and outflow, and different functional units and equipment (e.g. 2 outer compartments and 1 different middle compartment). Such a system is for example described in U.S. Pat. No. 4,179,366, where, at one moment in time, a first outer tank and the middle tank act as activation tanks while the second tank acts as a post-clarification tank. At another moment in time, the flow through the tank is reversed, so that the second outer tank now acts as an activation tank, and the first outer tank as a post-clarification tank. The middle tank continues to operate as activation tank.

A hybrid cyclic operating system with almost the same asymmetric functional cycle is described in U.S. Pat. No. 3,977,965. The only difference is the type of tanks used (ditches are used in stead of rectangular tanks) and the integration of nitrogen removal (generic principle) by adding a fed-stirred active phase next to the fed aerated phase).

Also in DE-3147920 and in BE-899757, similar hybrid systems are described.

All systems in above patents typically consist of an embodiment (rectangular tanks, square tanks or ditches) divided by two walls (with opening) in three compartments. The outer compartments serve alternately as active (fed, aerated, stirred) and sedimentation compartments, the middle compartment always acts as an aeration compartment. In one phase, wastewater-sludge mixture flows from one aerated, fed and/or stirred outer compartment to the middle aerated compartment and finally to the opposite outer sedimentation compartment (where treated effluent leaves the system). In the subsequent main phase, wastewater-sludge mixture flows in the opposite direction from the newly active outer (former sedimentation) compartment back to the middle compartment and to the new outer sedimentation (former fed and aerated) compartment, where treated effluent leaves the system. Waste sludge can be evacuated out of the actual sedimentation compartment.

All these systems describe an intermediate phase where the one outer compartments is prepared to shift function from active compartment to sedimentation compartment.

The functional cycles describe sludge transfer from one outer compartment via the middle compartment to the opposite outer compartment and back in the opposite direction. The functional cycles give rise to an unequal sludge concentration distribution over the three compartments, which is responsible for an unequal loading over the three compartments. The outer compartments are higher loaded and the middle compartment is lower loaded, which generates a not so effective efficiency of the aeration system. The sludge concentration in the outer compartments is higher than in the middle compartment, hindering the sedimentation process.

SUMMARY OF THE INVENTION

It is an object of the present invention to provide a method for biological wastewater treatment which does not present the disadvantages mentioned before.

In particular it is an object of the present invention to provide a method for biological wastewater treatment whereby no separation in space between an active reactor and a sedimentation tank is needed, and which does not present the disadvantage of variable volumes, which results in a low use to total volume ratio, and which is therefore generally not cost effective for high flow rates, and intermittent influent feeding and effluent discharge.

This object is obtained by a wastewater treatment process or system according to the present invention, which process or system is a hybrid continuous flow, cyclic operating, substantially constant level, activated sludge process with a symmetric functional cycle.

The system combines all advantages of the conventional technology and the fill-and-draw, sequencing batch reactor (SBR) or cyclic operating technology without having of their disadvantages.

According to an embodiment of the invention, an activated sludge wastewater process for treating wastewater is provided comprising the steps of:

(a) in a first phase of operation: continuously receiving wastewater into a first compartment (A) of a series of fluidly linked compartments where it mixes with sludge received from a subsequent compartment of the series, (b) passing the wastewater-sludge mixture along the series of compartments from the first compartment (A) of the series to subsequent compartments (B, C) of the series where internal substrates are further metabolised, (c) passing the metabolised wastewater-sludge mixture to a last compartment (D) of the series where biomass is separated from effluent, (d) discharging effluent from the current last compartment (D), (e) preparing a compartment (C) of the series which is not the current last compartment to become a new last compartment for separation of biomass and effluent in a new phase of operation, repeating steps (a) to (e) in the new operating phase, whereby all compartments (A, B, C, D) of the first phase become a series of fluidly linked compartments in the new phase with the new last compartment being used for separation of biomass and effluent. The new compartment for the separation compartment may be, for instance, the penultimate compartment or the first compartment in the preceding phase.

The biological reactor of the hybrid system to which this process applies comprises different hydraulically connected compartments for a single stage, which compartments are all identical, have the same equipment and follow the same functional cycle with reaction and sedimentation separated in time, while having constant level and continuous influent inflow and effluent outflow for both the overall system as for the hydraulically connected individual units. A separate sedimentation tank and sludge raking and recirculation devices are not needed. The reactor volume and reactor level in the identical tanks are constant.

The functional cycle arranges the reaction and sedimentation functions within the single embodiment separated in time. The reactor volume and reactor level in the identical tanks are substantially constant.

The symmetric functional cycle allows for symmetric (equal) influent distribution and therefore symmetric sludge and oxygen demand distribution. The functional cycle and the occurrence of identical functional units introduces a complete system redundancy; every tank can be separated from the other tanks by closing valves in interconnecting piping or channels, when maintenance is necessary.

The said functional cycle supports the introduction of substantial substrate gradients and promotes thus the formation of well settling flocks by the so called internal selector effect (high substrate/sludge ratio).

The said functional cycle supports optimal biological nitrogen and phosphorus removal by alternating anoxic (mixed), anaerobic (mixed) and aerobic (mixed, aerated) sequences in the activated compartment to promote denitrification, nitrification and the phosphorus metabolism in the activated sludge.

A biological reactor of the hybrid system according to the present invention comprises a plurality of units for a single stage process. The single stage process is generally applied for diluted to moderate concentrated industrial and municipal wastewaters.

All units or compartments of the biological reactor are hydraulically connected. There is no outer compartment nor middle compartment from point of view of functional cycle. The functional cycle can start or end at all compartments.

Combinations in series and parallel of said system are made depending on wastewater characteristics.

The said hybrid system is equipped with a core connecting infrastructure, containing interconnecting piping, automatic valves and monitoring and control equipment which together facilitate the functional operation of the said hybrid system.

The total hybrid system can be easily covered and/or built underground so that emissions and visual impact can be greatly reduced.

According to another part, the invention provides a continuous flow, constant level process for treating wastewater in a single reactor allowing alternate biological treatment and sedimentation, whereby sludge is recirculated to an infeed compartment by mechanical means such as e.g. a pump.

Although there has been constant improvement, change and evolution of wastewater treatment systems, the present concepts are believed to represent substantial new and novel improvements, including departures from prior practices, resulting in the provision of more efficient, stable and reliable devices of this nature.

Other features and advantages of the present invention will become apparent from the following detailed description, taken in conjunction with the accompanying drawings, which illustrate, by way of example, the principles of the invention. The description is given for the sake of example only, without limiting the scope of the invention.

DESCRIPTION OF THE ILLUSTRATIVE EMBODIMENTS

The present invention will be described with respect to particular embodiments and with reference to certain drawings but the invention is not limited thereto but only by the claims. The drawings described are only schematic and are non-limiting.

A biological wastewater treatment reactor for applying a method according to the present invention, comprises at least three units or compartments, which all have the same size and contain the same equipment. The reactor volume and the level in the tanks are always constant.

$1^{st}$ Embodiment: Preferred 4-unit Embodiment

Figure 1:
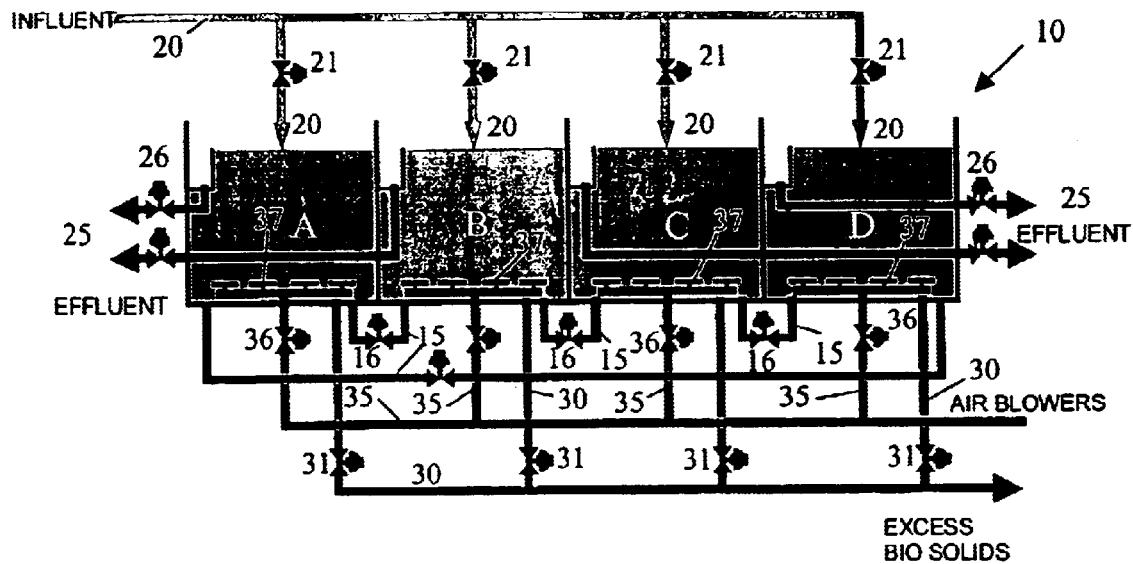
FIG. 1 is a hydraulic scheme of a preferred 4-unit embodiment according to the present invention.

In FIG. 1, a hydraulic scheme of a preferred 4-unit embodiment is shown. It represents an aerobic biological reactor 10 comprising four hydraulically connected identical compartments A, B, C, D for a single stage process. The compartments A, B, C, D of the preferred 4-unit embodiment are connected with each other in such a way that each compartment is connected to exactly two other compartments by a direct hydraulic connection 15. A closing valve 16 is provided on each hydraulic connection 15.

Influent can be directed to every single compartment A, B, C, D by influent feeding means 20. The influent feeding means 20 to each compartment A, B, C, D can be closed off by valve means 21.

Effluent can be discharged from every single compartment A, B, C, D via effluent discharging means 25. The effluent discharging means 25 can be closed by valve means 26.

Sludge can be wasted from every single compartment A, B, C, D by sludge discharging means 30. The sludge discharging means 30 are provided with valve means 31 for closing the sludge discharging means 30.

Each of the compartments A, B, C, D is connected to an air blower (not represented) by means of air pipes 35, each provided with a closing air valve 36 for closing off the air pipes 35.

Every connection, inlet or outlet can be automatically closed or opened and therefore every compartment A, B, C, D can be separated from the other compartments when maintenance is necessary (complete redundancy). This automatic closing or opening is driven by a control unit such as a PC, a PLC, an FPGA, etc.

The reactor volumes and the level in the compartments A, B, C, D are always constant.

The preferred 4-unit continuous, hybrid cyclic operating system operates according to a symmetric functional cycle (cyclic operation), that allows successive biological treatment and sedimentation in a single reactor (reaction and sedimentation separated in time).

Two preferred functional cycles will be described hereafter, a preferred functional cycle of the preferred 4-unit embodiment and an alternative functional cycle of the preferred 4-unit embodiment.

For both functional cycles, every compartment A, B, C, D of the 4-unit embodiment follows exactly the same cycle. Therefore, the cycles are called symmetric functional cycles.

Both functional cycles of the preferred 4-unit embodiment subsequently alternate between four main phases and four intermediate phases (main phase 1, intermediate phase 1, main phase 2, intermediate phase 2, etc.).

During each of the main phases, three compartments are active and one compartment is in sedimentation. Influent is added in one of the three active compartments and effluent leaves the sedimentation compartment.

Within the main phases, several subphases can occur to introduce and enhance biological nutrient removal. The subphases only affect the active compartments where aeration and mixing are alternated to become alternately anoxic, anaerobic and aerobic environments.

The time of the main phases is always maximised, but depends on the hydraulic loading of the system (which is highly depending on concentration of the wastewater), since this determines the sludge transport from the (during that phase) feed compartment in the direction of the (during that phase) sedimentation compartment. Before the sludge concentration becomes too low in the feed compartment and too high in the sedimentation compartment, the flow direction will be changed by shifting to the next main phase via an intermediate phase. In case of the preferred functional cycle the former sedimentation tank will be fed and its sludge will be transported to the former fed active tank.

Next to this sludge distribution limit there is also a limited duration for the retention of the thickened sludge in the sedimentation compartment. After a certain time it must be regenerated (aerated) to be able to restore its biodegradation capacity.

During intermediate phases, two compartments are active, one of the in the former main phase active compartments is transferred to sedimentation compartment and the sedimentation compartment of the former main phase still stays sedimentation compartment up to the end of the intermediate phase.

The duration of an intermediate phase is always minimised, and the time needed is depending on the sludge sedimentation velocity. The better the sedimentation capacity, the shorter the intermediate phase and the higher the active time (= treatment capacity) of the system.

Figure 12:
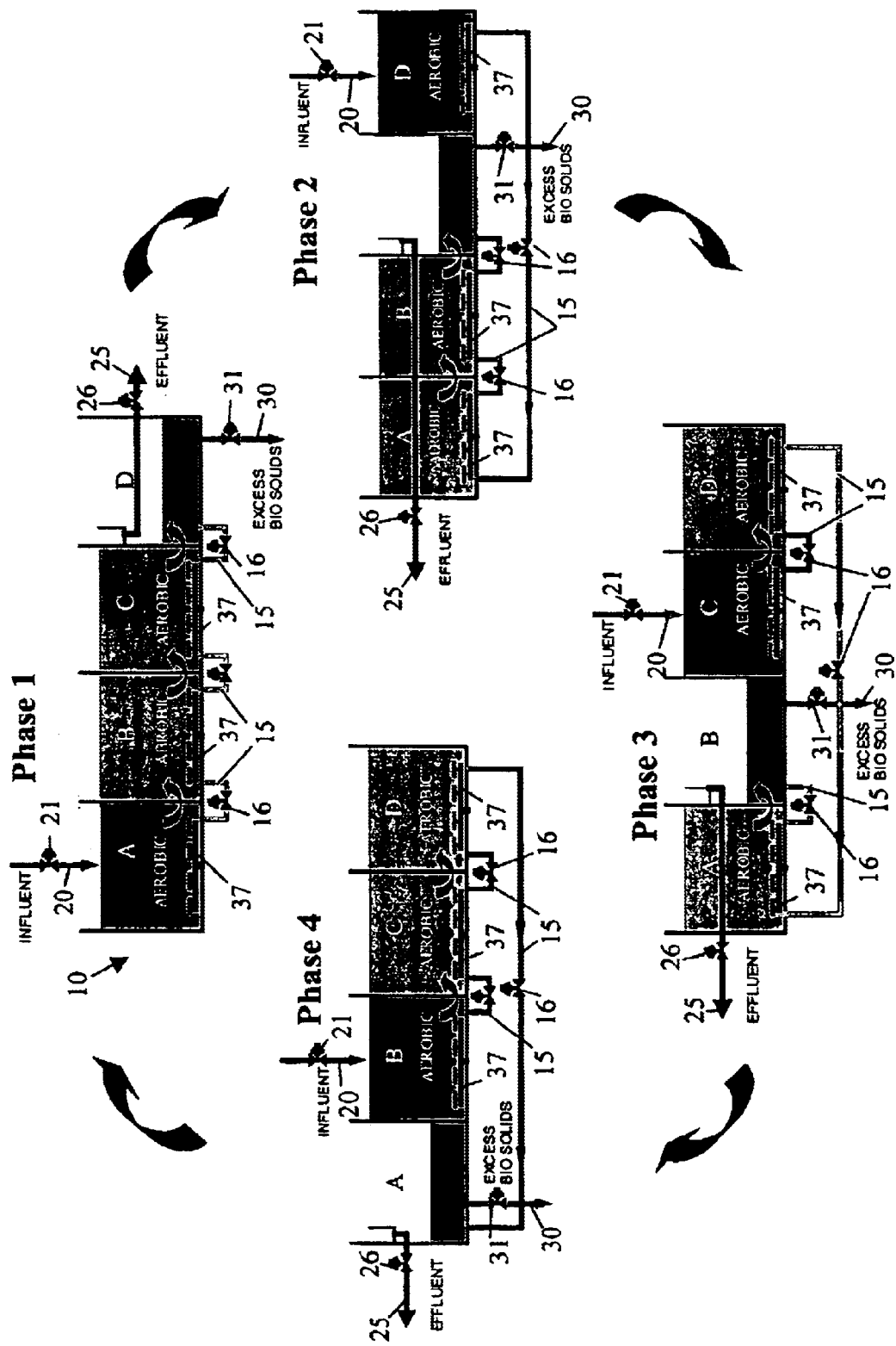
FIG. 12 is a diagrammatic illustration of a preferred functional cycle of a preferred 4-unit embodiment according to the present invention, used for accumulation-regeneration and carbon removal.
Figure 13:
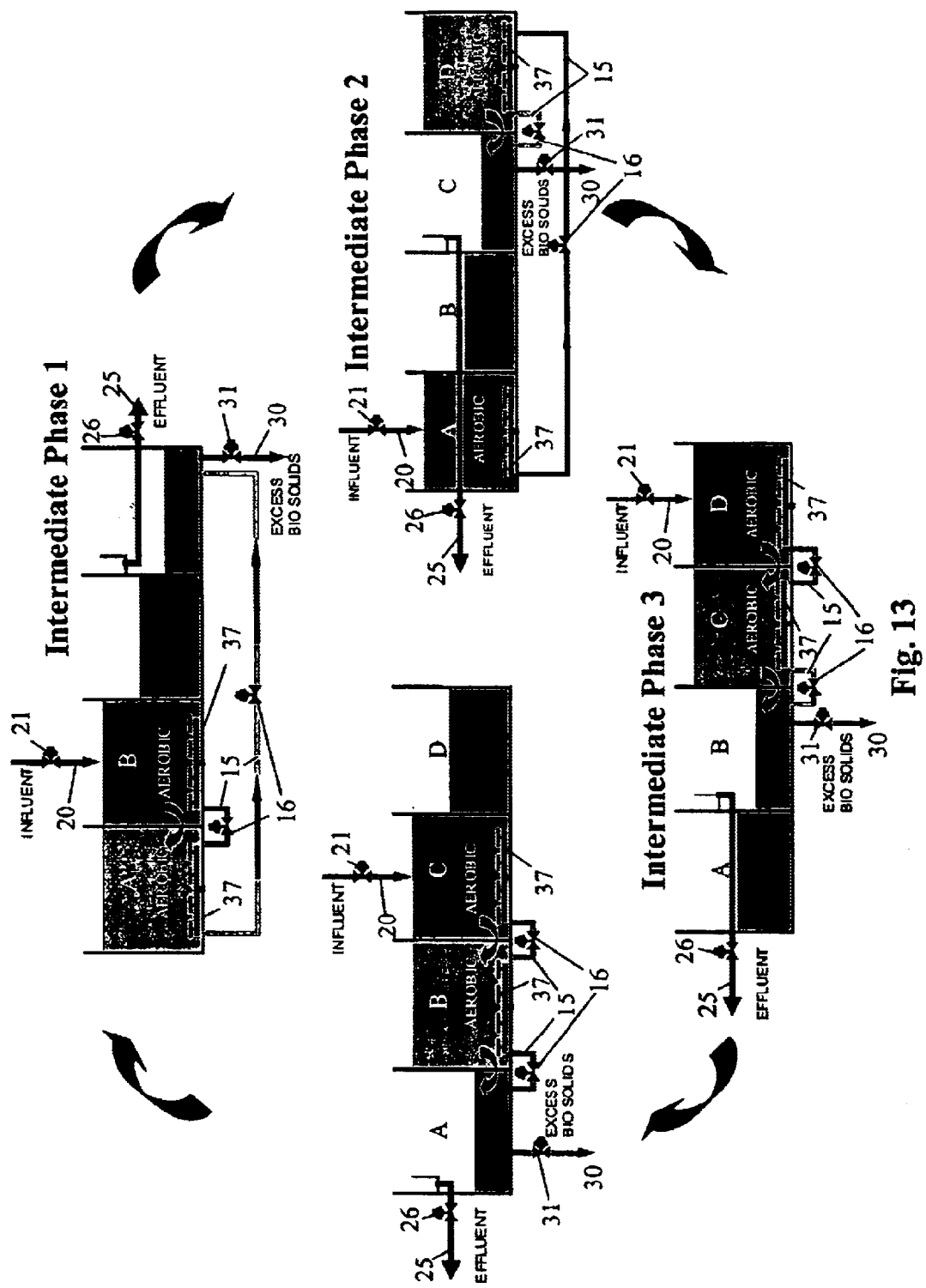
FIG. 13 is a diagrammatic illustration of intermediate phases of the preferred functional cycle of FIG. 12.

A preferred cyclic operation of the preferred 4-unit embodiment for carbon removal is now described, with regard to FIG. 12 and FIG. 13.

During main phases and intermediate phases of the preferred functional cycle of the preferred 4-unit embodiment, the influent feeding is subsequently directed to the four compartments in an anti clock-wise direction (A, D, C, B, A, D, C, B, A, . . . ), as can be seen in FIG. 12. The directions given hereinafter are given for the sake of clarity only; each direction can be changed into its opposite direction without altering the invention.

The sludge/water mixture transport, during main phases, from compartment to compartment, is in a clockwise direction (A, B, C, D→D, A, B, C→C, D, A, B→B, C, D, A→A, B, C, D→etc.). The sludge/water mixture transport, during intermediate phases, from compartment to compartment, is in an anti-clockwise direction (B, A, D→A, D, C→D, C, B→C, B, A→B, A, D→etc.).

Hereafter the subsequent phases are described. Between every two main phases, an intermediate phase takes place.

Main Phase 1:

As can be seen in FIG. 12a, wastewater (influent) is pumped into compartment A by influent feeding means 20, where it mixes with sludge previously received from zone B. It may furthermore be aerated by aeration means 37 connected to the air pipes 35. The aerated and/or mixed influent-sludge mixture is flowing from compartment A, over compartment B to compartment C, while the internal substrates are further metabolised. Therefor, the sludge may be further aerated by means of the aeration means 37 in any or all of the compartments B and C. The mixed liquor finally arrives in compartment D, where the biomass is separated from the treated effluent, e.g. by gravitational sedimentation, by flotation or by any other method. Aeration means 37 in compartment D are shut off by closing the corresponding air valve 36, in order to stabilise the content of compartment D. The treated effluent or supernatant of compartment D is finally discharged via effluent discharging means 25 such as an effluent weir to an effluent pit. Excess bio solids are discharged from compartment D via sludge discharging means 30. The hydraulic interconnection between compartment A and D is closed (and therefore not shown in FIG. 12a). All other hydraulic interconnections are open.

Intermediate Phase 1:

During the preparation of compartment C as new sedimentation tank, as represented in FIG. 13a, influent is directed to compartment B by influent feeding means 20. The influent-sludge mixture is transported from compartment B via compartment A towards compartment D. The effluent continues to be discharged from compartment D via effluent discharge means 25, and excess bio solids continue to be discharged from compartment D via sludge discharging means 30. The hydraulic interconnections between compartments B and C and compartments C and D are closed.

Main Phase 2:

As represented in FIG. 12b, influent is directed into compartment D by influent feeding means 20, where it mixes with sludge received from compartment A during intermediate phase 1. The aerated and/or mixed influent-sludge mixture, is transported from compartment D, via compartment A and compartment B, towards compartment C. Compartment C is now functioning as sedimentation tank and the biomass is separated from the treated effluent by gravitational sedimentation, by flotation or by any other method. The treated effluent or supernatant of compartment C is discharged via effluent discharging means 25. Excess bio solids are discharged from compartment C via sludge discharging means 30. The hydraulic interconnection between compartments C and D is closed. All other hydraulic interconnections are open.

Intermediate Phase 2:

During the preparation of compartment B as new sedimentation tank, influent is directed to compartment A by influent feeding means 20, and the influent-sludge mixture is transported from compartment A via compartment D towards compartment C. Effluent continues to be discharged from compartment C by effluent discharging means 25, and excess bio solids continue to be discharged from compartment C via sludge discharging means 30. The hydraulic interconnections between compartments A and B and compartments B and C are closed. This intermediate phase is represented in FIG. 13*b*.

Main Phase 3:

As represented in FIG. 12*c*, influent is now directed into compartment C by influent feeding means 20, where it mixes with sludge received from compartment D during intermediate phase 2. The aerated and/or mixed influent-sludge mixture is flowing via compartment D and compartment A towards compartment B, where now the biomass is separated from the treated effluent by gravitational sedimentation, by flotation or by any other method, and effluent is finally discharged via effluent discharging means 25. Excess bio solids are discharged from compartment B via sludge discharging means 30. The hydraulic interconnection between compartment B and C is closed. All other hydraulic interconnections are open.

Intermediate Phase 3:

During the preparation of compartment A as new sedimentation tank, influent is directed to compartment D by influent feeding means 20, and the influent-sludge mixture is transported from compartment D via compartment C towards compartment B. The effluent continues to be discharged from compartment B by effluent discharging means 25, and excess bio solids continue to be discharged from compartment B via sludge discharging means 30. The hydraulic interconnections between compartments A and B and compartments A and D are closed. This intermediate phase is represented in FIG. 13*c*.

Main Phase 4:

Influent is now pumped into compartment B by influent feeding means 20, as represented in FIG. 12*d*. It mixes there with sludge received from compartment C during intermediate phase 3. The aerated and/or mixed influent-sludge mixture is flowing via compartment C and compartment D towards compartment A, where the biomass is separated from the treated effluent by gravitational sedimentation, by flotation or by any other method, and the effluent is discharged by effluent discharging means 25. Excess bio solids are discharged from compartment A via sludge discharging means 30. The hydraulic interconnection between compartments A and B is closed. All other hydraulic interconnections are open.

Intermediate Phase 4:

During the preparation of compartment D as new sedimentation tank, influent is directed to compartment C via influent feeding means 20, as represented in FIG. 13*d*. The influent-sludge mixture is transported from compartment C via compartment B towards compartment A. The effluent continues to be discharged from compartment A via effluent discharging means 25. Excess bio solids continue to be discharged from compartment A via sludge discharging means 30. The hydraulic interconnections between compartments A and D and compartments C and D are closed.

This functional cycle thus described is completely symmetrical: each compartment is subsequently in a different functional phase, which functional phases are continuously repeated: phase 1, phase 2, phase 3, phase 4, phase 1, phase 2, phase 3, phase 4, phase 1, phase 2, phase 3, phase 4, etc. The symmetric functional cycle allows for symmetric (equal) influent distribution and therefore symmetric sludge and oxygen demand distribution. The invented functional cycle and the occurrence of identical functional units introduces a complete system redundancy.

Next to the advantages of the symmetric functional cycle, principle advantage of this preferred functional cycle is the fact that the new sedimentation compartment is not directly fed during two subsequent phases, and therefore contains totally regenerated sludge. As a consequence high removal efficiency and very low BOD (biochemical oxygen demand—the amount of oxygen required by micro-organisms to degrade that part of organic matter which is biodegradable within a fixed period of time, usually 5 days), COD (chemical oxygen demand—the amount of oxygen used to chemically oxidise organic matter) and nutrients concentrations occur and very stringent discharge limits can be met.

A typical application range of the preferred 4-unit embodiment is 20.000–100.000 PE (population equivalents). Large-scale municipal plants up to several millions PE, are designed as parallel lanes of each 100.000 PE. This system is also especially suitable for the treatment of highly nitrogen and phosphorus loaded wastewaters.

Figure 14:
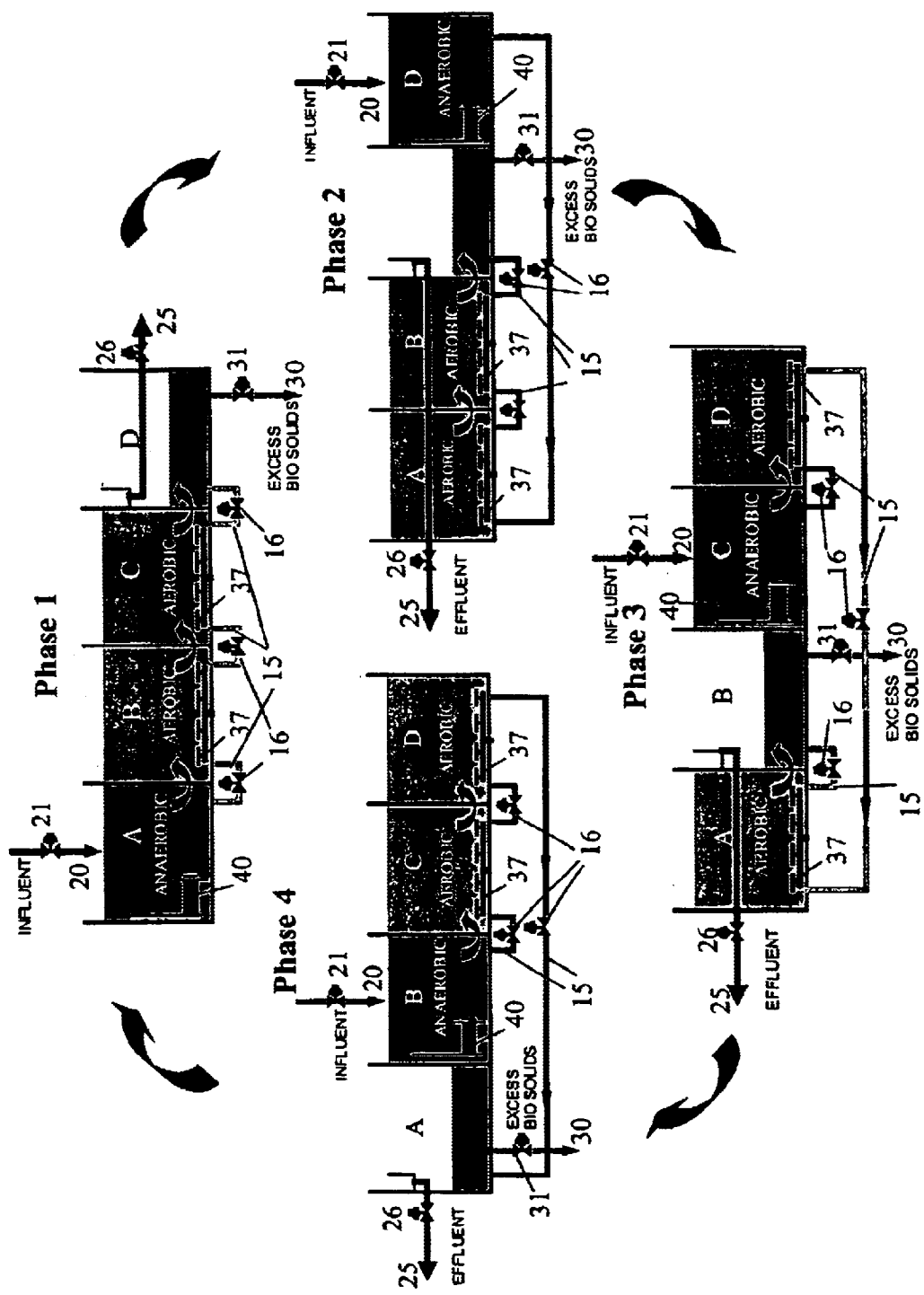
FIG. 14 is a diagrammatic illustration of a preferred functional cycle of a preferred 4-unit embodiment according to the present invention, used for phosphorus and carbon removal.

An example of the main phases of the functional cycle according to the present invention for biological phosphorus removal is represented in FIG. 14, whereby the difference with the functional cycle of FIG. 12 is that wastewater is treated anaerobically in the compartments where influent is fed in. Mixing means 40 are provided in each compartment for that reason.

Figure 15:
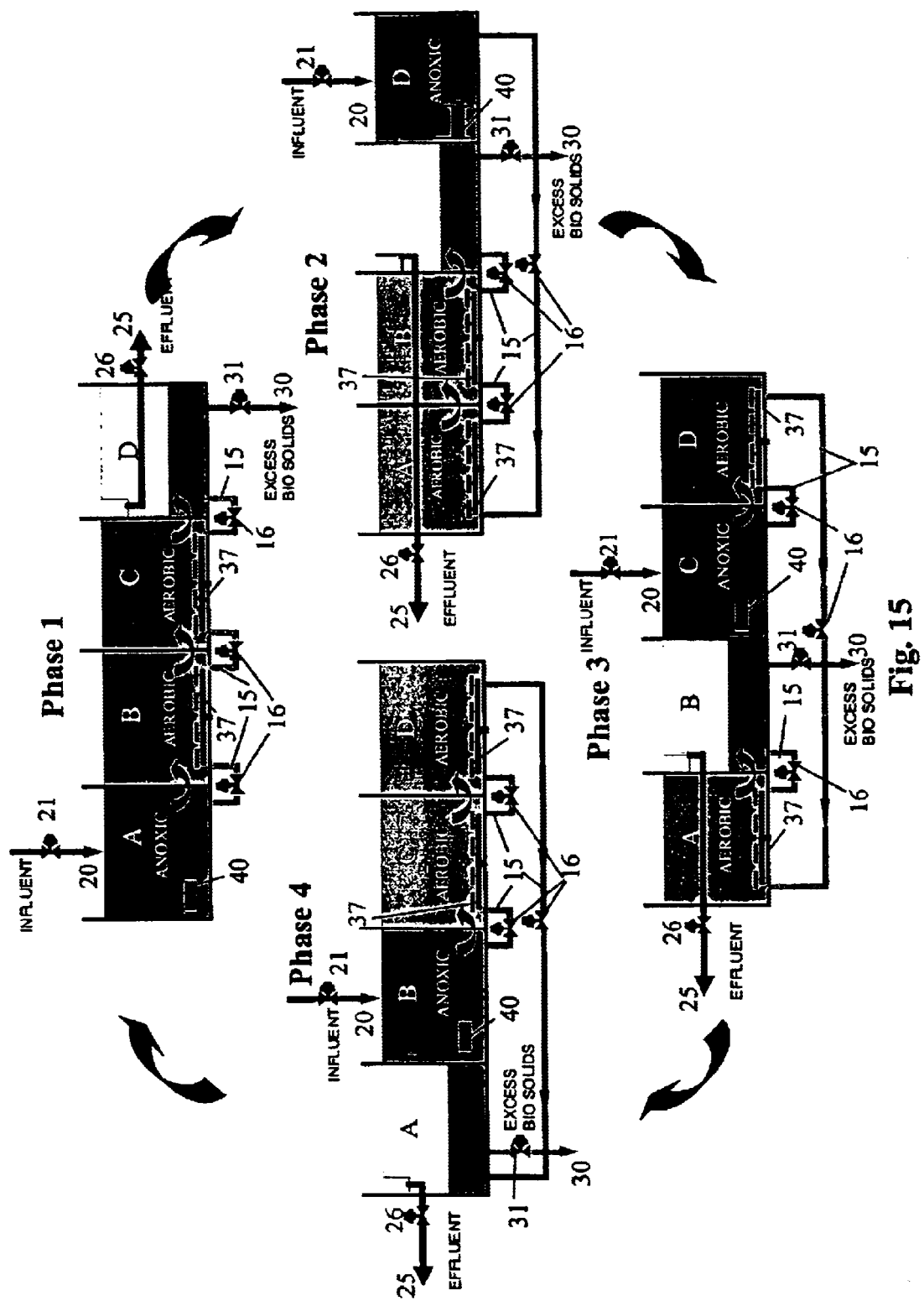
FIG. 15 is a diagrammatic illustration of a preferred functional cycle of a preferred 4-unit embodiment according to the present invention, used for nitrogen and carbon removal.

Another example of the main phases of the functional cycle according to the present invention for biological nitrogen removal is represented in FIG. 15, whereby the difference with the functional cycle of FIG. 12 is that wastewater is treated anaerobically in the compartments where influent is fed in. Mixing means 40 are provided in each compartment for that reason.

Figure 16:
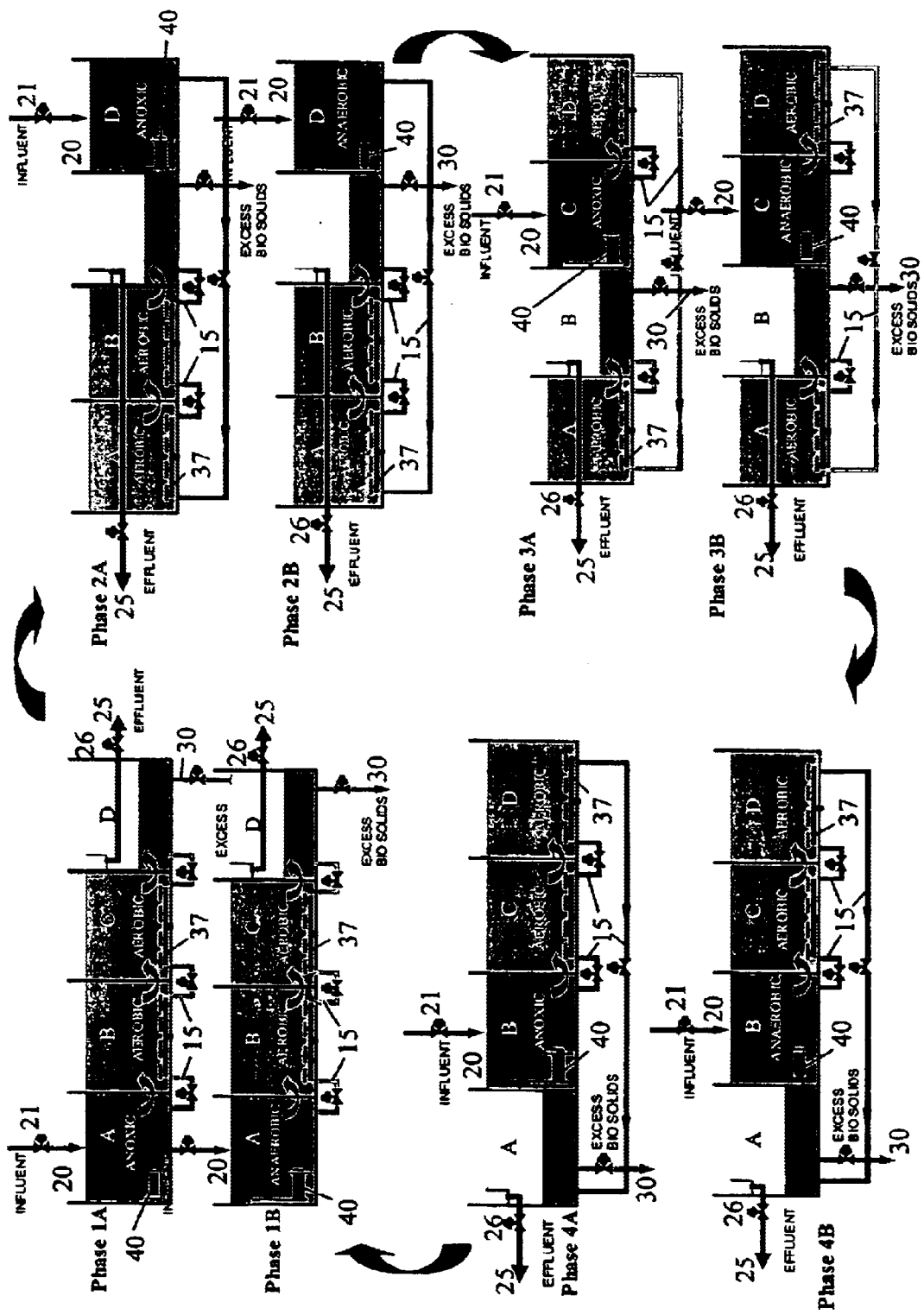
FIG. 16 is a diagrammatic illustration of a preferred functional cycle of a preferred 4-unit embodiment according to the present invention, used for nutrient and carbon removal.

FIG. 16 shows an example of the main phases, each main phase consisting of two subphases, of a functional cycle according to the present invention for combined biological nitrogen and phosphorus removal. A first subphase for each phase treats the influent anoxically, and a second subphase for each phase treats the influent anaerobically.

It is to be noted that, within the concept of the showed preferred functional cycles, variations are allowed for the alternation between aerated (aerobic) and stirred (anoxic and anaerobic) active compartments. This means that within the said main phases or intermediate phases the active compartments can be alternated as often as necessary between these aerated and stirred states. Also simultaneous aeration or stirring of the active compartments is allowed to enhance or optimise biological nutrient removal.

Figure 17:
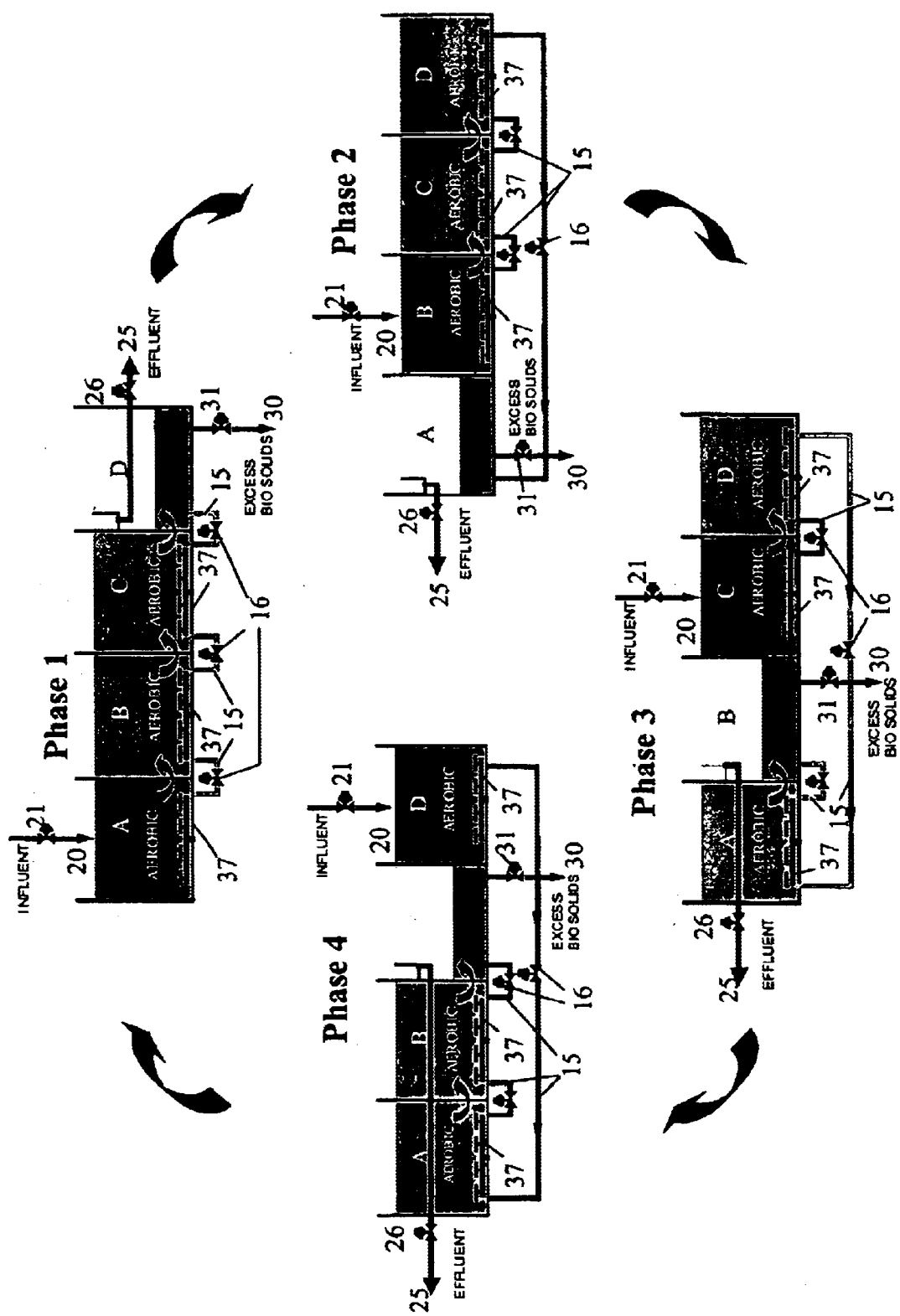
FIG. 17 is a diagrammatic illustration of an alternative functional cycle of a preferred 4-unit embodiment according to the present invention, used for accumulation-regeneration and carbon removal.
Figure 18:
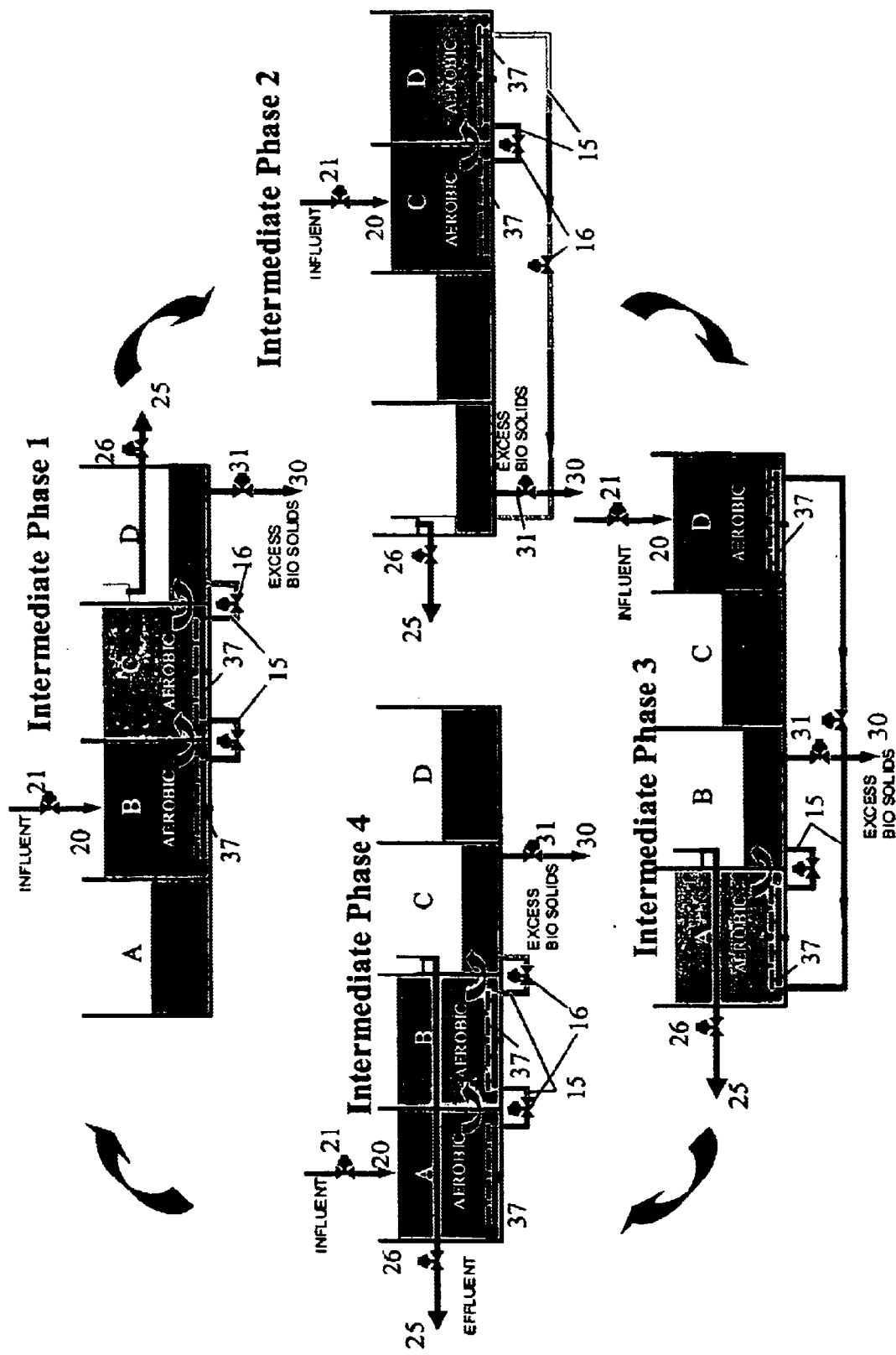
FIG. 18 is a diagrammatic illustration of intermediate phases of the alternative functional cycle of FIG. 17.

An alternative cyclic operation of the preferred 4-unit embodiment for carbon removal is now described, with regard to FIG. 17 and FIG. 18.

During main phases and intermediate phases of the alternative functional cycle of the preferred 4-unit embodiment, the influent feeding is subsequently directed to the four compartments in a clock-wise direction (A, B, C, D, A, B, C, D, A, etc.).

The sludge/water mixture transport, during main phases, from compartment to compartment, is in a clockwise direction (A, B, C, D→B, C, D, A→C, D, A, B→D, A, B, C→A, B, C, D→etc.). The sludge/water mixture transport, during intermediate phases, from compartment to compartment, is also in clockwise direction (B, C, D→C, D, A→D, A, B→A, B, C→B, C, D→etc.).

Hereafter the subsequent phases are described. Between every two main phases, an intermediate phase takes place.

Main Phase 1:

As represented in FIG. 17a, wastewater (influent) is pumped into compartment A by influent feeding means 20. The aerated and/or mixed influent-sludge mixture is flowing from compartment A and B to compartment C, while the internal substrates are further metabolised. The mixed liquor finally arrives in compartment D, where the biomass is separated from the treated effluent by gravitational sedimentation, by flotation or by any other method. The treated effluent or supernatant of compartment D is finally discharged via effluent discharging means 25 such as an effluent weir, to an effluent pit. Excess bio solids are discharged from compartment D by sludge discharging means 30. The hydraulic interconnection between compartment A and D is closed. All other hydraulic interconnections are open.

Intermediate Phase 1:

During the preparation of compartment A as new sedimentation tank, the influent is directed to compartment B by influent feeding means 20. The influent-sludge mixture is transported from compartment B via compartment C towards compartment D. The effluent continues to be discharged from compartment D via effluent discharging means 25. Excess bio solids continue to be discharged from compartment D via sludge discharging means 30. The hydraulic interconnections between compartments D and A and compartments A and B are closed. This is represented in FIG. 18a.

The isolated compartment A may (when necessary) be aerated first for some time to maximise the BOD (biochemical oxygen demand) and nutrient removal before transitions to sedimentation compartment.

Main Phase 2:

As represented in FIG. 17b, influent is directed into compartment B by influent feeding means 20. The aerated and/or mixed influent-sludge mixture, is transported via compartment C and compartment D, towards compartment A. Compartment A is now functioning as sedimentation tank and the biomass is separated from the treated effluent by gravitational sedimentation, by flotation or by any other method. Effluent is discharged from compartment A by effluent discharging means 25, and excess bio solids are discharged from compartment A by sludge discharging means 30. The hydraulic interconnection between compartment A and B is closed. All other hydraulic interconnections are open.

Intermediate Phase 2:

During the preparation of compartment B as new sedimentation tank, the influent is directed to compartment C by influent feeding means 20, as represented in FIG. 18b. The influent-sludge mixture is transported from compartment C via compartment D towards compartment A. The effluent continues to be discharged from compartment A by effluent discharging means. Excess bio solids continue to be discharged from compartment A by sludge discharging means 30. The hydraulic interconnections between compartments A and B and compartments B and C are closed.

The isolated compartment B may (when necessary) be aerated first for some time to maximise the BOD and nutrient removal before transitions to sedimentation compartment.

Main Phase 3:

As represented in FIG. 17c, influent is now directed into compartment C by influent feeding means 20. The aerated and/or mixed influent-sludge mixture is flowing via compartment D and compartment A towards compartment B, where now the biomass is separated from the treated effluent and effluent is finally discharged by effluent discharging means 25. Excess bio solids are discharged from compartment B by sludge discharging means 30. The hydraulic interconnection between compartment B and C is closed. All other hydraulic interconnections are open.

Intermediate Phase 3:

During the preparation of compartment C as new sedimentation tank, the influent is directed to compartment D by influent feeding means 20, as represented in FIG. 18c, and the influent-sludge mixture is transported from compartment D via compartment A towards compartment B. The effluent and excess bio solids continue to be discharged from compartment B by effluent discharging means 25 and sludge discharging means 30 respectively. The hydraulic interconnections between compartments B and C and compartments C and D are closed.

The isolated compartment C may (when necessary) be aerated first for some time to maximise the BOD and nutrient removal before its transition into sedimentation compartment.

Main Phase 4:

Influent is now pumped into compartment D, as represented in FIG. 17d. The aerated and/or mixed influent-sludge mixture is flowing via compartment A and compartment B towards compartment C, where the biomass is separated from the treated effluent by gravitational sedimentation, by flotation or by any other method, and the effluent is discharged by effluent discharging means 25. Excess bio solids are discharged via sludge discharging means 30. The hydraulic interconnection between compartment C and D is closed. All other hydraulic interconnections are open.

Intermediate Phase 4:

During the preparation of compartment D, as new sedimentation tank, represented in FIG. 18d, the influent is directed to compartment A by influent feeding means 20, and the influent-sludge mixture is transported from compartment A via compartment B towards compartment C. The effluent continues to be discharged from compartment C via effluent discharging means 25, and excess bio solids continue to be discharged from compartment C via sludge discharging means 30.

The isolated compartment D may (when necessary) be aerated first for some time to maximise the BOD and nutrient removal before transitions to sedimentation compartment.

Again, this symmetric functional cycle is continuously repeated: phase 1, phase 2, phase 3, phase 4, phase 1, phase 2, phase 3, phase 4, phase 1, phase 2, phase 3, phase 4, etc.

Next to the advantages of the symmetric functional cycle, the main advantage of this alternative functional cycle is the constant clock-wise flow direction, which make the interconnected piping and valve system more simple.

The preferred 3-unit embodiment can be used when the wastewater contains moderate nitrogen and phosphorus concentrations. This system again can be used for the treatment of both municipal and industrial wastewater. The typical application range of this configuration is again 20.000 to 100.000 PE Large-scale municipal plants up to several millions PE, are designed as parallel lanes of each 100.000 PE.

Figure 19:
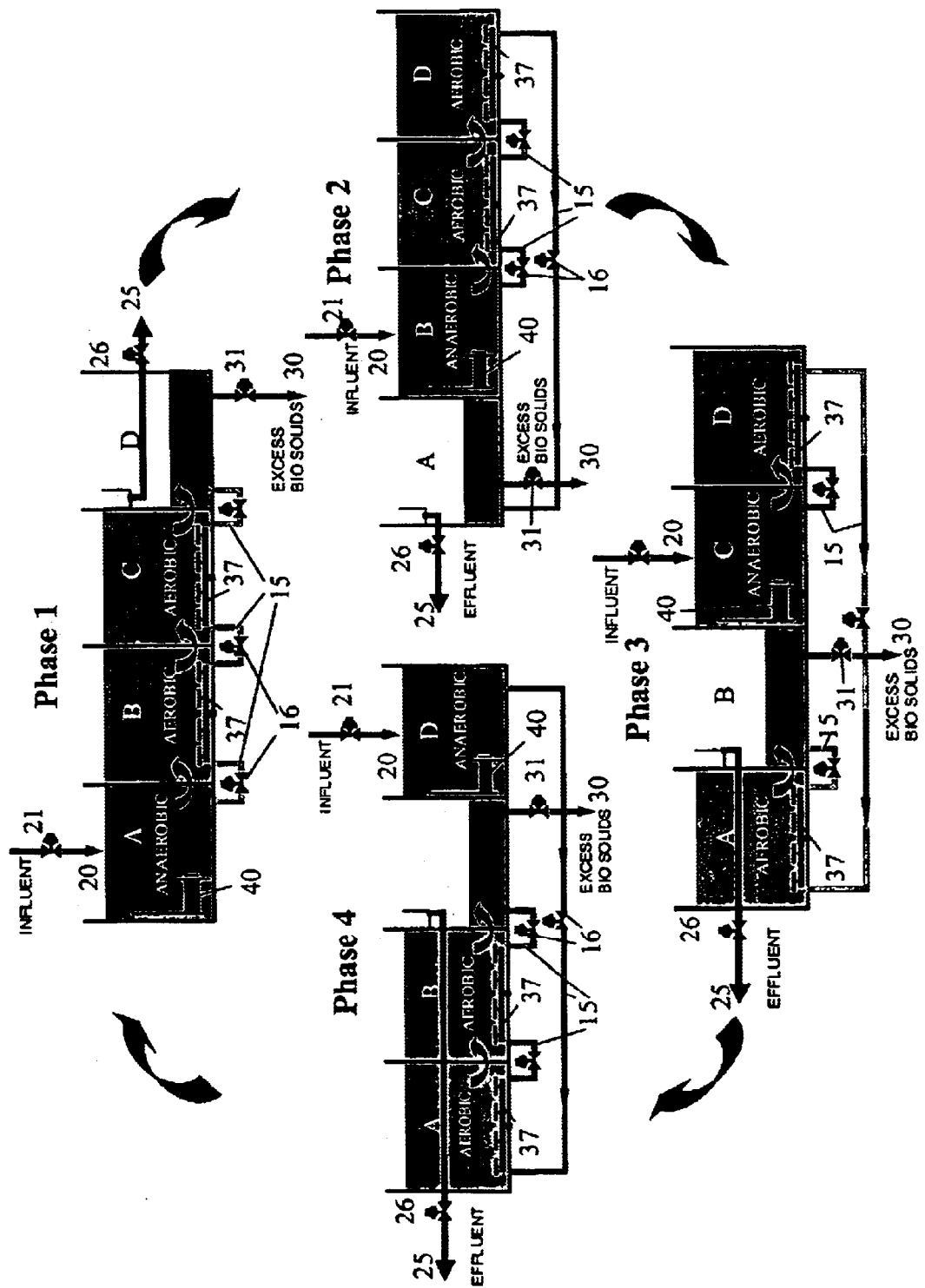
FIG. 19 is a diagrammatic illustration of an alternative functional cycle of a preferred 4-unit embodiment according to the present invention, used for phosphorus and carbon removal.

Another example of the main phases of the alternative functional cycle for biological phosphorus and carbon removal is represented in FIG. 19, whereby the difference with the functional cycle of FIG. 17 is that wastewater is treated anaerobically in the compartments where influent is fed in. Mixing means 40 are provided in each compartment for stirring the mixture.

Figure 20:
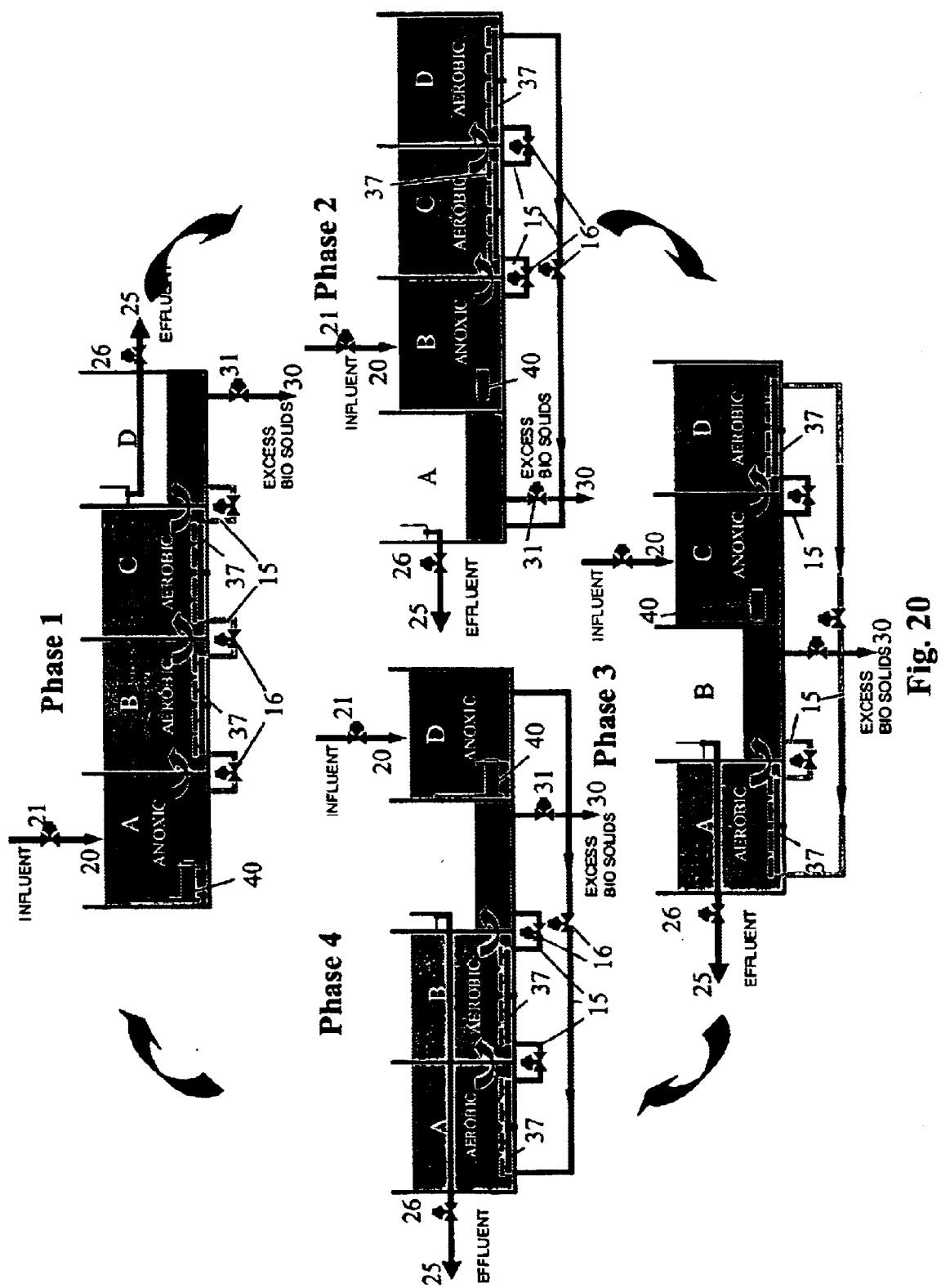
FIG. 20 is a diagrammatic illustration of an alternative functional cycle of a preferred 4-unit embodiment according to the present invention, used for nitrogen and carbon removal.

FIG. 20 shows still another an example of the main phases of the alternative functional cycle according to the present invention for biological nitrogen removal, whereby wastewater is treated anoxically in the compartments where influent is fed in. Again, mixing means 40 are provided.

Figure 21:
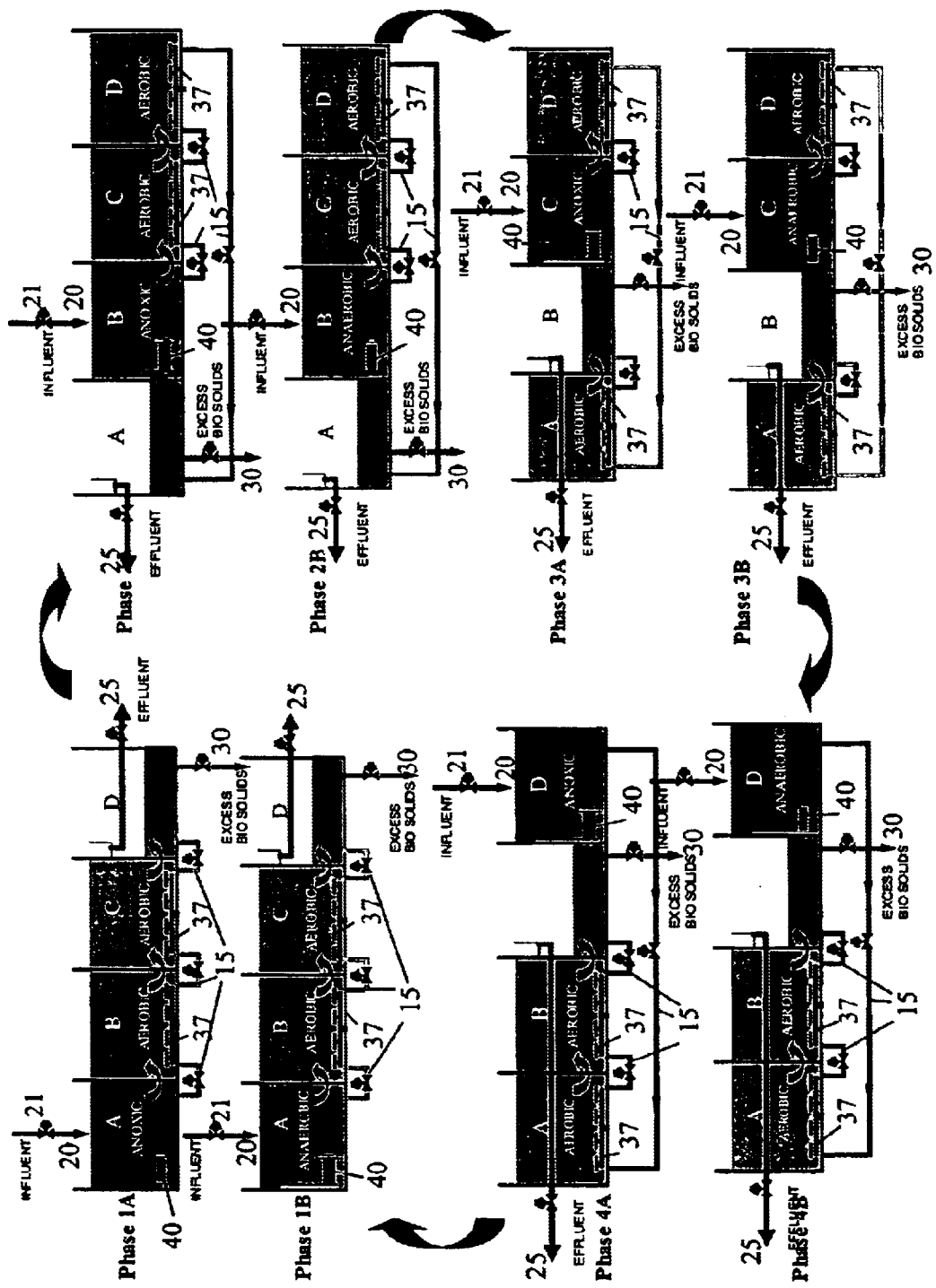
FIG. 21 is a diagrammatic illustration of an alternative functional cycle of a preferred 4-unit embodiment according to the present invention, used for nutrient and carbon removal.

FIG. 21 shows an example of the main phases, each main phase consisting of two subphases, of an alternative functional cycle according to the present invention for combined nutrient and carbon removal. A first subphase for each phase treats the influent anoxically, and a second subphase for each phase treats the influent anaerobically.

It should be noted that within the concept of the showed alternative functional cycles, variations are allowed for the alternation between aerated (aerobic) and stirred (anoxic and anaerobic) active compartments. This means that within the said main phases or intermediate phases, the active compartments can be alternated as often as necessary between these aerated and stirred states. Also simultaneous aeration or stirring of the active compartments is allowed to enhance or optimise biological nutrient removal.

$2^{nd}$ Embodiment: Preferred 3-unit Embodiment

Figure 2:
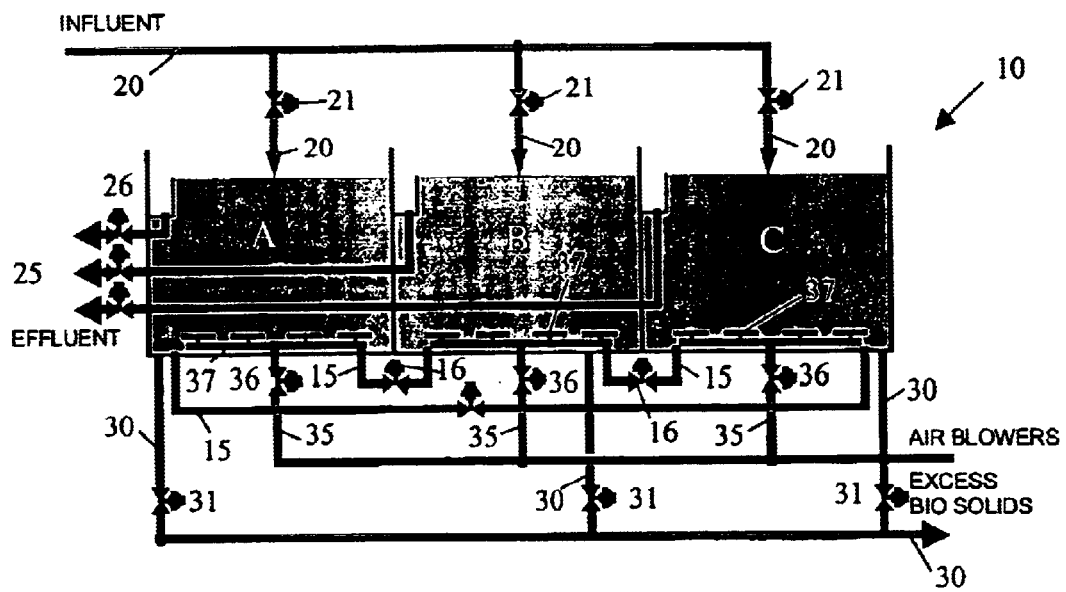
FIG. 2 is a hydraulic scheme of a preferred 3-unit embodiment according to the present invention.

In FIG. 2, a hydraulic scheme of a preferred 3-unit embodiment is shown. It represents an aerobic biological reactor 10 comprising three hydraulically connected identical compartments A, B, C for a single stage process. The compartments A, B, C for the preferred 3-unit embodiment are connected with each other in such a way that each compartment is connected to exactly two other compartments by a direct hydraulic connection 15. A closing valve 16 is provided on each hydraulic connection 15.

Influent can be directed to every single compartment A, B, C by influent feeding means 20. The influent feeding means 20 to each compartment A, B, C can be closed off by valve means 21.

Effluent can be discharged from every single compartment A, B, C via effluent discharging means 25. The effluent discharging means 25 can be closed by valve means 26.

Sludge can be wasted from every single compartment A, B, C by sludge discharging means 30. The sludge discharging means 30 are provided with valve means 31.

Each of the compartments A, B, C is connected to an air blower (not represented) by means of air pipes 35, each provided with a closing air valve 36.

Every connection, inlet or outlet can be automatically closed or opened and therefore every compartment A, B, C can be separated from the other compartments when maintenance is necessary (complete redundancy). This automatic closing or opening is driven by a control unit such as a PC, a PLC, an FPGA, etc.

The reactor volumes and the level in the compartments A, B, C are always constant.

Said 3-unit continuous, constant level, hybrid cyclic operating system operates according to a symmetric functional cycle (cyclic operation), that allows successive biological treatment and sedimentation in a single reactor (reaction and sedimentation are separated in time).

Two functional cycles that will be described hereafter: a preferred functional cycle of the 3-unit embodiment and an alternative functional cycle of the 3-unit embodiment. For both functional cycles, every compartment of the 3-unit embodiment follows exactly the same cycle. Therefore these cycles are called symmetric functional cycles.

Both functional cycles of the 3-unit embodiment subsequently alternate between three main phases and three intermediate phases (main phase 1, intermediate phase 1, main phase 2, intermediate phase 2, main phase 3, intermediate phase 3, main phase 1, etc.).

During the main phases, two compartments are active and one compartment is in sedimentation. Influent is added in one of the two active compartments and effluent leaves the sedimentation compartment.

Within the main phases, several subphases can occur to introduce and enhance biological nutrient removal. The subphases only affect the active compartments where aeration and mixing are alternated to become alternately anoxic, anaerobic and aerobic circumstances.

The time of the main phases is always maximised, but depends on the hydraulic loading of the system (which is highly depending on concentration of the wastewater), since this determines the sludge transport from the fed compartment in the direction of the sedimentation compartment. Before the sludge concentration becomes too low in the fed compartment and too high in the sedimentation compartment, the flow direction will be reversed by shifting to the next main phase via an intermediate phase. Next to this sludge distribution limit there is also a limited duration for the retention of the thickened sludge in the sedimentation compartment. After a certain time it must be regenerated (aerated) to be able to restore its biodegradation capacity.

During each of the intermediate phases, one compartment is active, one of the in the former main phase active compartments is transferred to sedimentation compartment and the sedimentation compartment of the former main phase still stays sedimentation compartment till the end of the intermediate phase.

The duration of an intermediate phase is always minimised. The time needed is depending on the sludge sedimentation velocity. The better the sedimentation capacity, the shorter the intermediate phase and the higher the active time (=treatment capacity) of the system.

Figure 24:
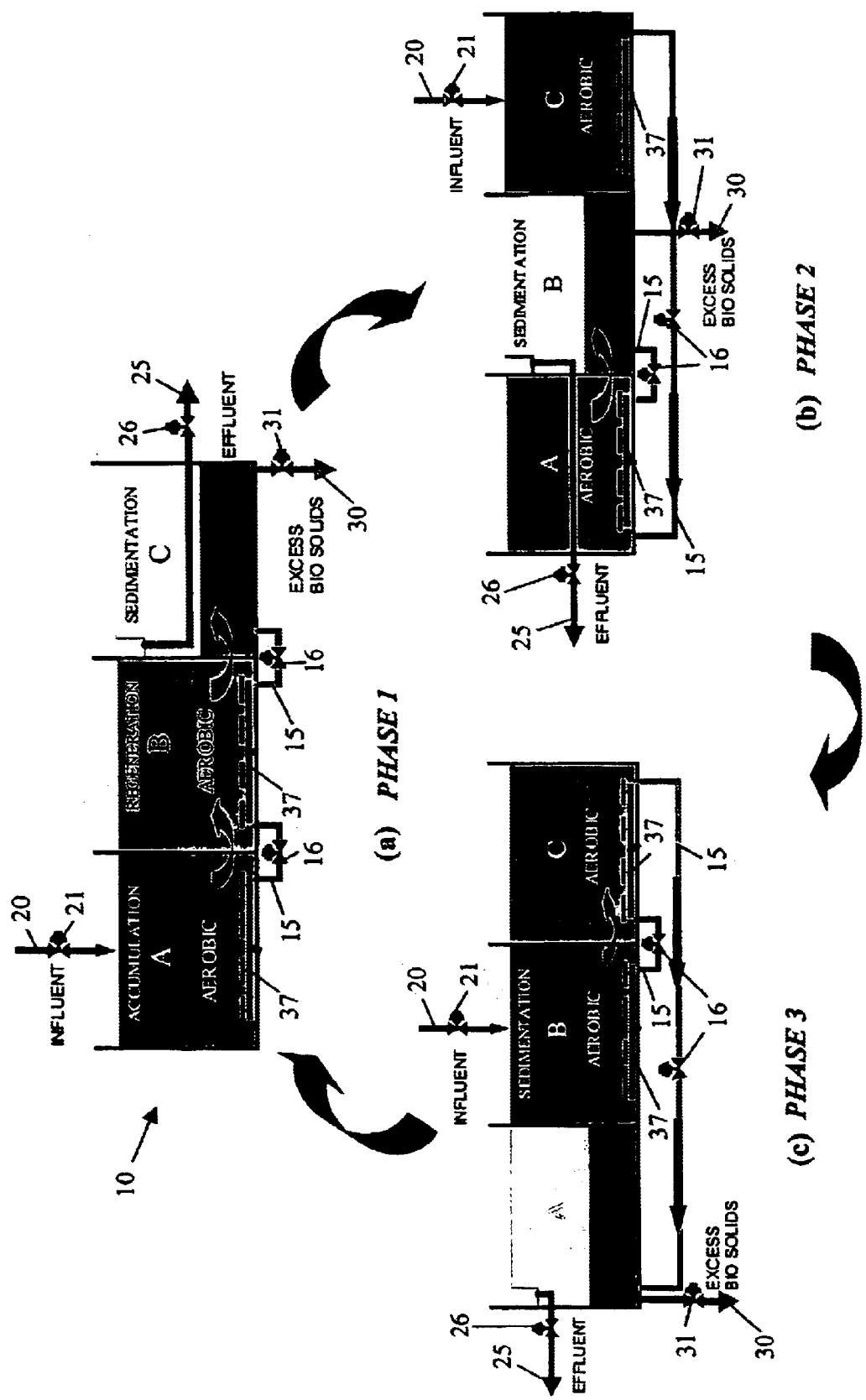
FIG. 24 is a diagrammatic illustration of a preferred functional cycle of a preferred 3-unit embodiment according to the present invention, used for accumulation-regeneration and carbon removal.
Figure 25:
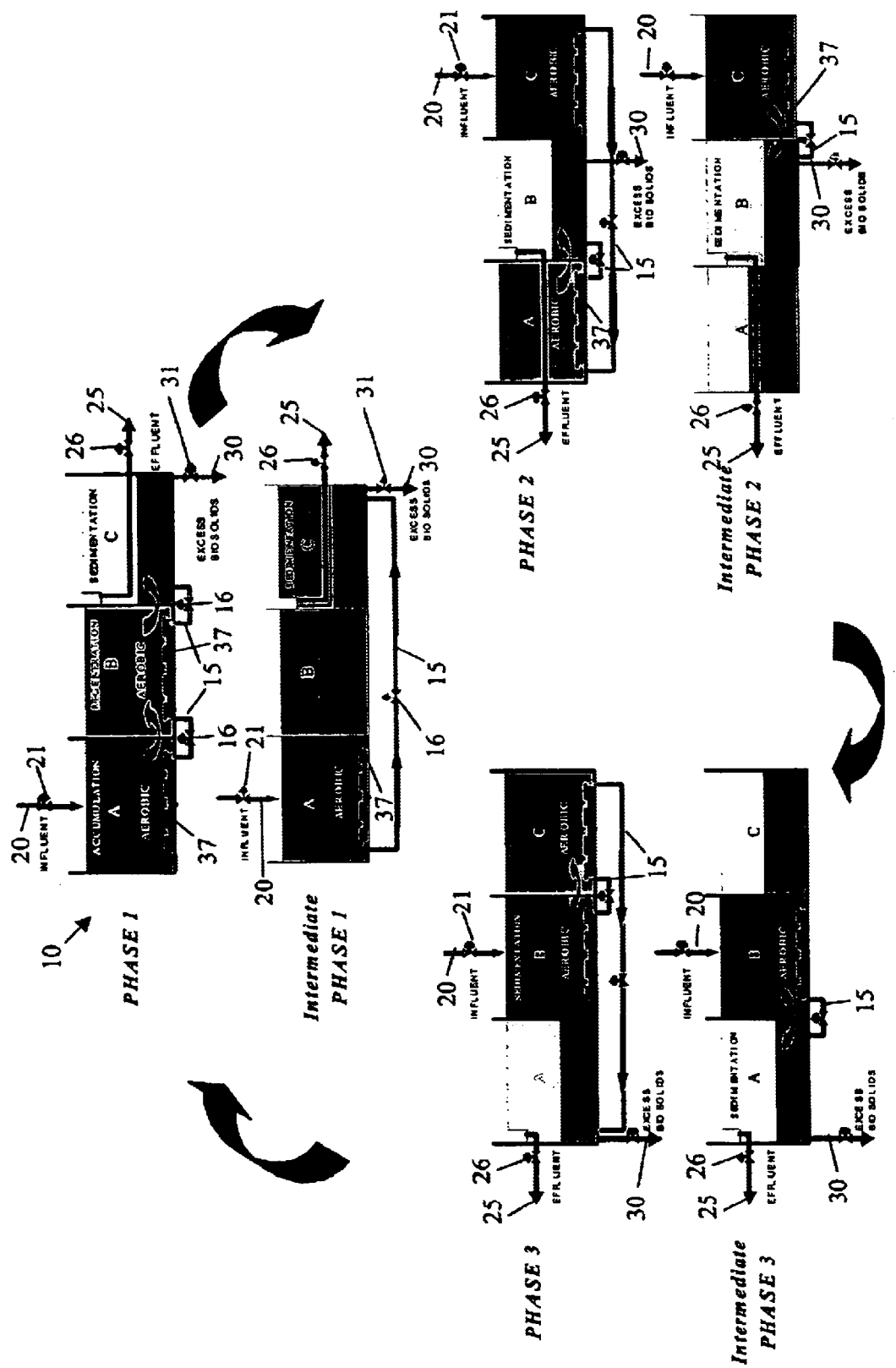
FIG. 25 is a diagrammatic illustration of intermediate phases of the preferred functional cycle of FIG. 24.

First, a preferred cyclic operation of the preferred cyclic 3-unit embodiment is described, with regard to FIG. 24 and FIG. 25.

During the main phases and intermediate phases of the preferred functional cycle of the 3-unit embodiment, the influent feeding is subsequently directed to the three compartments in an anti clock-wise direction (A, C, B, A, C, B, A, etc.).

The sludge/water mixture transport, during main phases, from compartment to compartment, is in a clockwise direction (A, B, C→C, A, B→B, C, A→A, B, C→etc.). The sludge/water mixture transport, during intermediate phases, from compartment to compartment, is in an anti-clockwise direction (A, C→C, B→B, A→A, C, etc.).

Hereafter, the subsequent phases are described. Between every two main phases, an intermediate phase takes place.

Main Phase 1:

As represented in FIG. 24 and in FIG. 25a, wastewater (influent) is pumped into compartment A by influent feeding means 20. The aerated and/or mixed influent-sludge mixture is flowing from compartment A and B to compartment C, where the biomass is separated from the treated effluent by gravitational sedimentation, by flotation or by any other method. The treated effluent or supernatant of compartment C is finally discharged via effluent discharging means 25 such as an effluent weir to the effluent pit. Excess bio solids may be discharged from compartment C by sludge discharging means 30. The hydraulic interconnection between compartment A and C is closed. All other hydraulic interconnections are open.

Intermediate Phase 1:

During the preparation of compartment B as new sedimentation tank, the influent is directed to compartment A by influent feeding means 20, and the influent-sludge mixture is transported from compartment A towards compartment C. The effluent and excess bio solids continue to be discharged from compartment C by effluent discharging means 25 and sludge discharging means 30 respectively. The hydraulic interconnections between compartments A and B and compartments B and C are closed, while the hydraulic interconnections between compartments A and C are open. This is represented in FIG. 25*a*.

Main Phase 2:

Influent is directed into compartment C by influent feeding means 20, as represented in FIG. 24*b* and FIG. 25*b*. The aerated and/or mixed influent-sludge mixture, is transported via compartment C and compartment A, towards compartment B. Compartment B is now functioning as sedimentation tank where the biomass is separated from the treated effluent under gravitational sedimentation, by flotation or by any other method. Effluent and excess bio solids are discharged from compartment B by effluent discharging means 25 and sludge discharging means respectively. The interconnection between compartment B and C is closed. All other interconnections are open.

Intermediate Phase 2:

During the preparation of compartment A as new sedimentation tank, as represented in FIG. 25*b*, the influent is directed to compartment C by influent feeding means 20. The influent-sludge mixture is transported from compartment C towards compartment B. The effluent and excess bio solids continue to be discharged from compartment B by effluent discharging means 25 and sludge discharging means 30 respectively. Only the hydraulic interconnection between compartment B and C is open.

Main Phase 3:

As represented in FIG. 24*c* and FIG. 25*c*, influent is now directed into compartment B by influent feeding means 20. The aerated and/or mixed influent-sludge mixture is flowing via compartment B and compartment C towards compartment A, where now the biomass is separated from the treated effluent by gravitational sedimentation, by flotation or by any other method, and effluent is finally discharged by effluent discharging means 25. Excess bio solids are discharged by sludge discharging means 30. The interconnection between compartment A and B is closed. All other interconnections are open.

Intermediate Phase 3:

During the preparation of compartment C as new sedimentation tank, the influent is directed to compartment B by influent feeding means 20, and the influent-sludge mixture is transported from compartment B towards compartment A. The hydraulic interconnections between compartment B and C and between C and A are closed. The effluent continues to be discharged from compartment A by effluent discharging means 25. Also excess bio solids continue to be discharged from compartment A by sludge discharging means 30.

This symmetric functional cycle is continuously repeated: phase 1, phase 2, phase 3, phase 1, phase 2, phase 3, phase 1, phase 2, phase 3, etc.

Main advantage of this preferred functional cycle is the fact that the new sedimentation compartment was not directly fed during the preceding phase and therefore contains totally regenerated sludge. As a consequence high removal efficiency and very low BOD, COD and nutrients concentrations occur, and very stringent discharge limits can be met.

Figure 26:
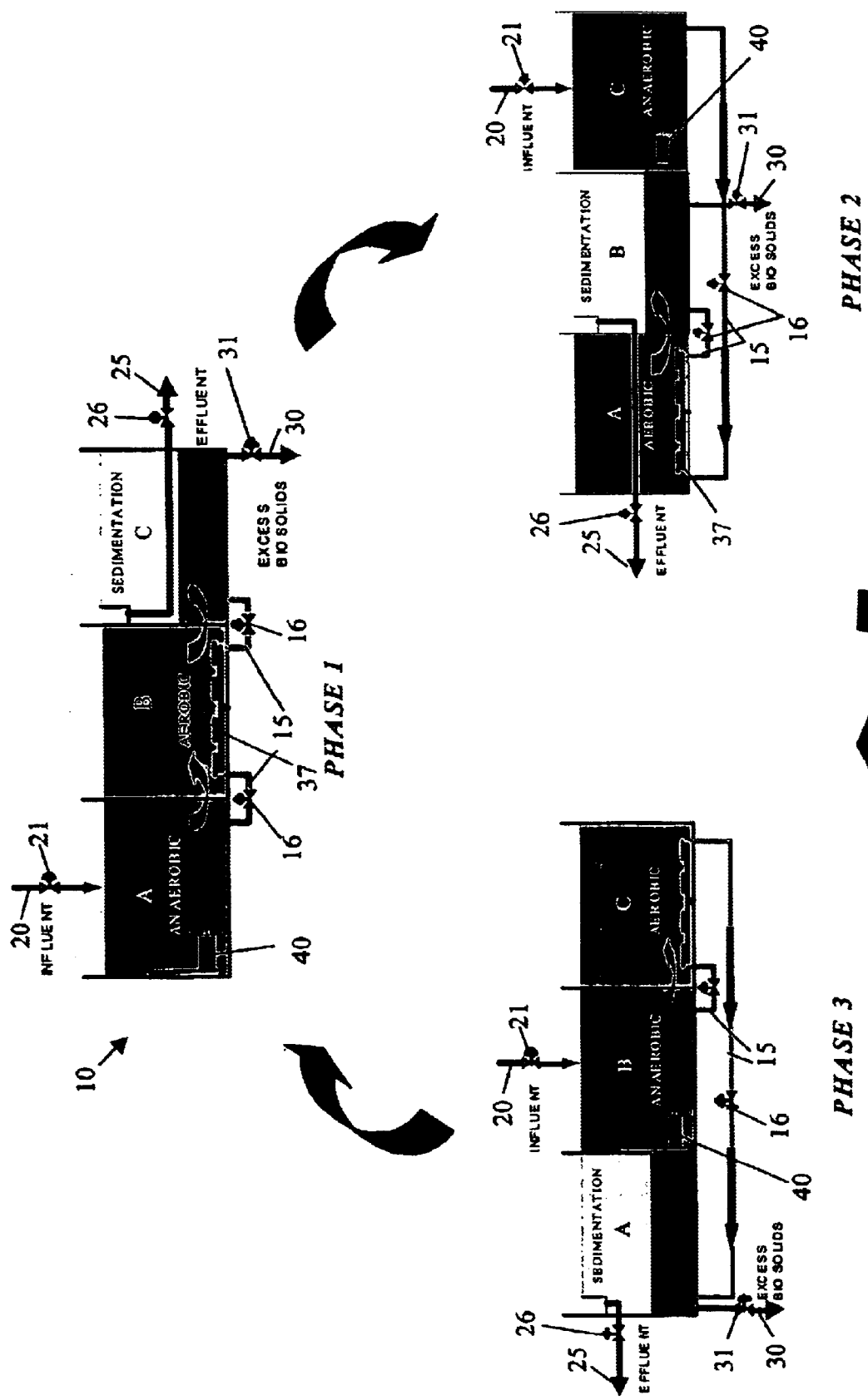
FIG. 26 is a diagrammatic illustration of a preferred functional cycle of a preferred 3-unit embodiment according to the present invention, used for phosphorus and carbon removal.

FIG. 26 shows an example of the main phases of a functional cycle for biological phosphorus removal, whereby the difference with the functional cycle of FIG. 24 is that wastewater is treated anaerobically in the compartments where influent is fed in. Mixing means 40 are provided in each compartment for stirring the mixture.

Figure 27:
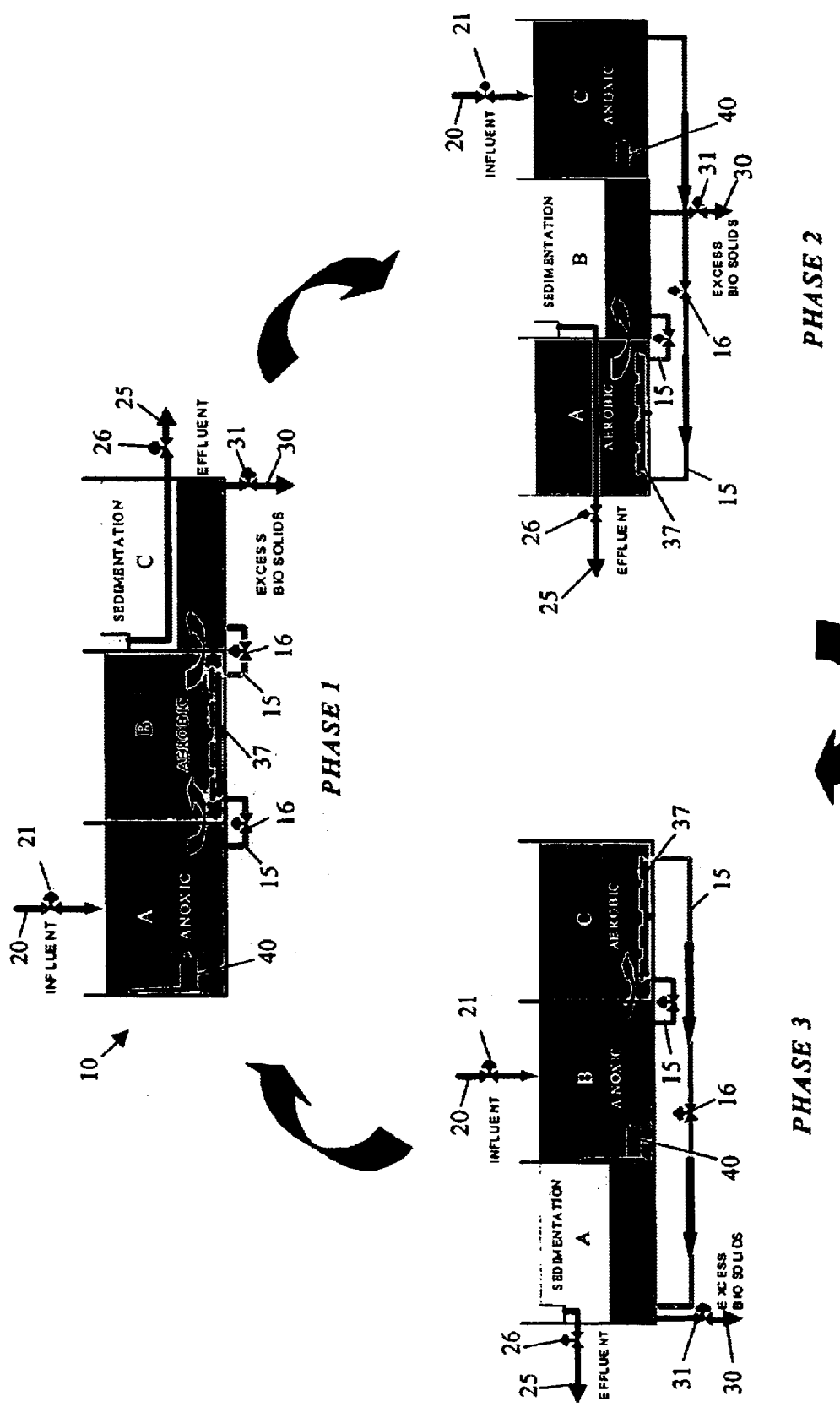
FIG. 27 is a diagrammatic illustration of a preferred functional cycle of a preferred 3-unit embodiment according to the present invention, used for nitrogen and carbon removal.

FIG. 27 shows an example of the main phases of the functional cycle for biological nitrogen removal. The difference with the functional cycle of FIG. 24 is that wastewater is treated anoxically in the compartments where influent is fed in. Mixing means 40 are provided in each compartment for stirring the mixture.

Figure 28:
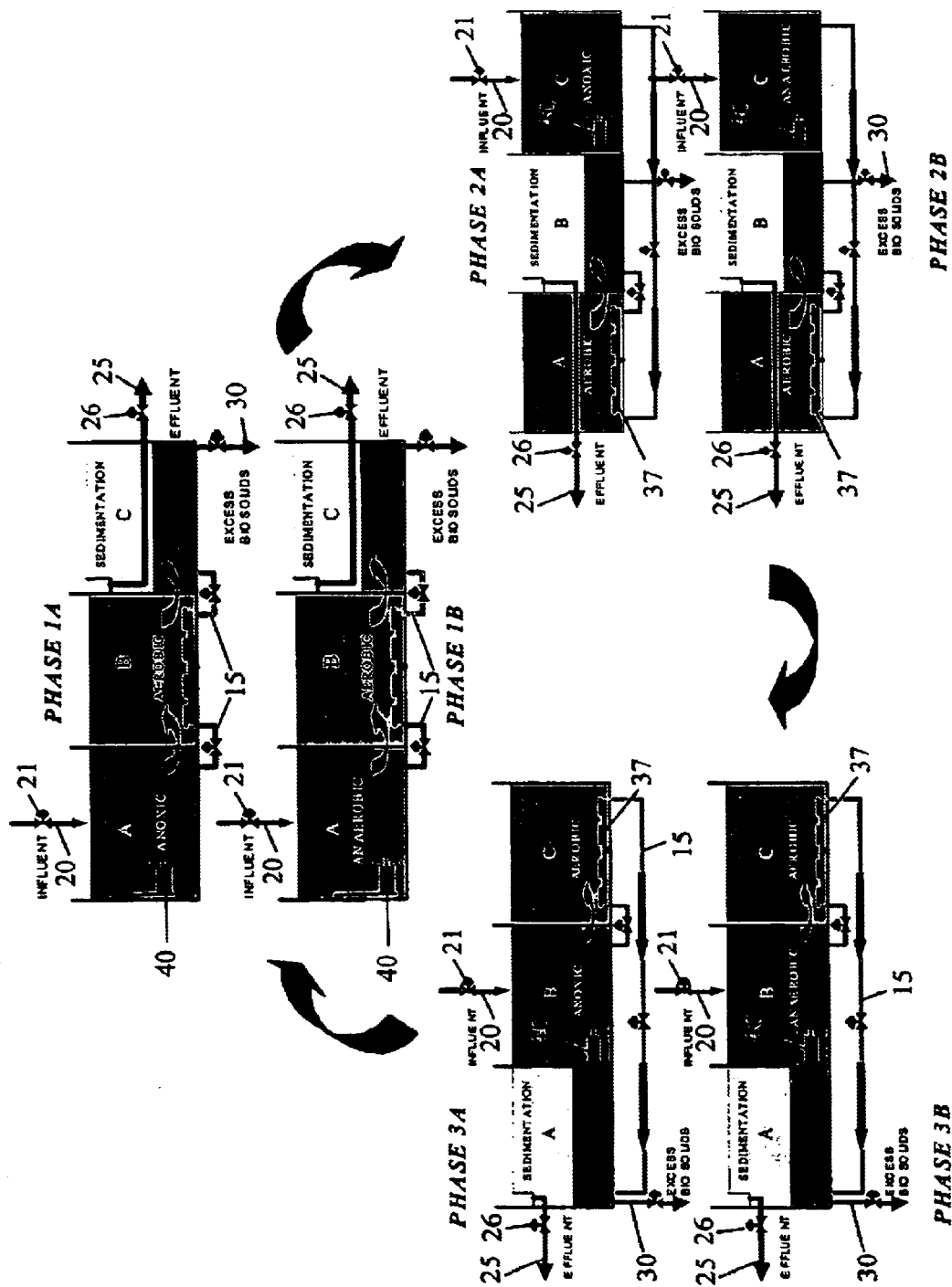
FIG. 28 is a diagrammatic illustration of a preferred functional cycle of a preferred 3-unit embodiment according to the present invention, used for nutrient and carbon removal.

FIG. 28 shows an example of the main phases of a functional cycle for combined biological nitrogen and phosphorus removal. Each main phase consists of two subphases, during which fed in wastewater is subsequently treated anoxically and anaerobically.

It is to be noted that within the concept of the showed preferred functional cycles variations are allowed for the alternation between aerated (aerobic) and stirred (anoxic and anaerobic) active compartments. This means that within the said main phases or intermediate phases the active compartments can be alternated as often as necessary between these aerated and stirred states. Also simultaneous aeration or stirring of the active compartments is allowed to enhance or optimise biological nutrient removal.

An alternative cyclic operation of the preferred cyclic 3-unit embodiment is now described.

During the main phases and intermediate phases of the alternative functional cycle of the 3-unit embodiment, the influent feeding is subsequently directed to the three compartments in a clock-wise direction (A, B, C, A, B, C, A, etc.).

The sludge/water mixture transport, during main phases, from compartment to compartment, is in a clockwise direction (A, B, C→B, C, A→C, A, B→A, B, C→etc.). The sludge/water mixture transport, during intermediate phases, from compartment to compartment, is in also in clockwise direction (B, C→C, A→A, B→B, C etc.).

Hereafter, the subsequent phases are described with reference to FIG. 29 and FIG. 30. Between every two main phases, an intermediate phase takes place.

Main Phase 1:

The wastewater (influent) is pumped into compartment A by influent feeding means 20. The aerated and/or mixed influent-sludge mixture is flowing from compartment A and B to compartment C, where the biomass is separated from the treated effluent by gravitational sedimentation, by flotation or by any other method. The treated effluent or supernatant of compartment C is finally discharged via effluent discharging means 25 such as an effluent weir to the effluent pit. Excess biomass is discharged from compartment C by sludge discharging means 30. The hydraulic interconnection between compartment A and C is closed. All other hydraulic interconnections are open.

Intermediate Phase 1:

During the preparation of compartment A as new sedimentation tank, the influent is directed to compartment B by influent feeding means 20, as represented in FIG. 30a. The influent-sludge mixture is transported from compartment B towards compartment C. The effluent and bio solids continue to be discharged from compartment C by effluent discharging means 25 and sludge discharging means 30. Only the hydraulic interconnection between compartment B and compartment C is open.

Main Phase 2:

As represented in FIG. 29b and in FIG. 30b, influent is directed into compartment B by influent feeding means 20. The aerated and/or mixed influent-sludge mixture is flowing via compartment B and compartment C towards compartment A, where now the biomass is separated from the treated effluent and effluent is finally discharged. The hydraulic interconnection between compartment A and B is closed. All other interconnections are open.

Intermediate Phase 2:

During the preparation of compartment B as new sedimentation tank, the influent is directed to compartment C by influent feeding means 20, and the influent-sludge mixture is transported from compartment C towards compartment A. The effluent and the excess bio solids continue to be discharged from compartment A by effluent discharging means 25 and sludge discharging means 30. The hydraulic interconnection between compartment A and C is open.

Main phase 3:

Influent is directed into compartment C by influent feeding means 20 and the aerated and/or mixed influent-sludge mixture, is transported via compartment C and compartment A, towards compartment B. Compartment B is now functioning as sedimentation tank and the biomass is separated from the treated effluent by gravitational sedimentation, by flotation or by any other method. Effluent and excess bio solids are discharged from compartment B by effluent discharging means 25 and sludge discharging means 30. The hydraulic interconnection between compartment B and C is closed. All other hydraulic interconnections are open.

Intermediate Phase 3:

During the preparation of compartment C as new sedimentation tank, the influent is directed to compartment A by influent feeding means 20. The influent-sludge mixture is transported from compartment A towards compartment B. The effluent and the excess bio solids continue to be discharged from compartment B by effluent discharging means 25 and sludge discharging means 30. Only the hydraulic connection between compartment A and B is open.

This symmetric functional cycle is continuously repeated : phase 1, phase 2, phase 3, phase 1, phase 2, phase 3, phase 1, etc.

Main advantage of this alternative functional cycle is the constant clock-wise flow direction, which make the interconnected piping and valve system more simple.

Figure 29:
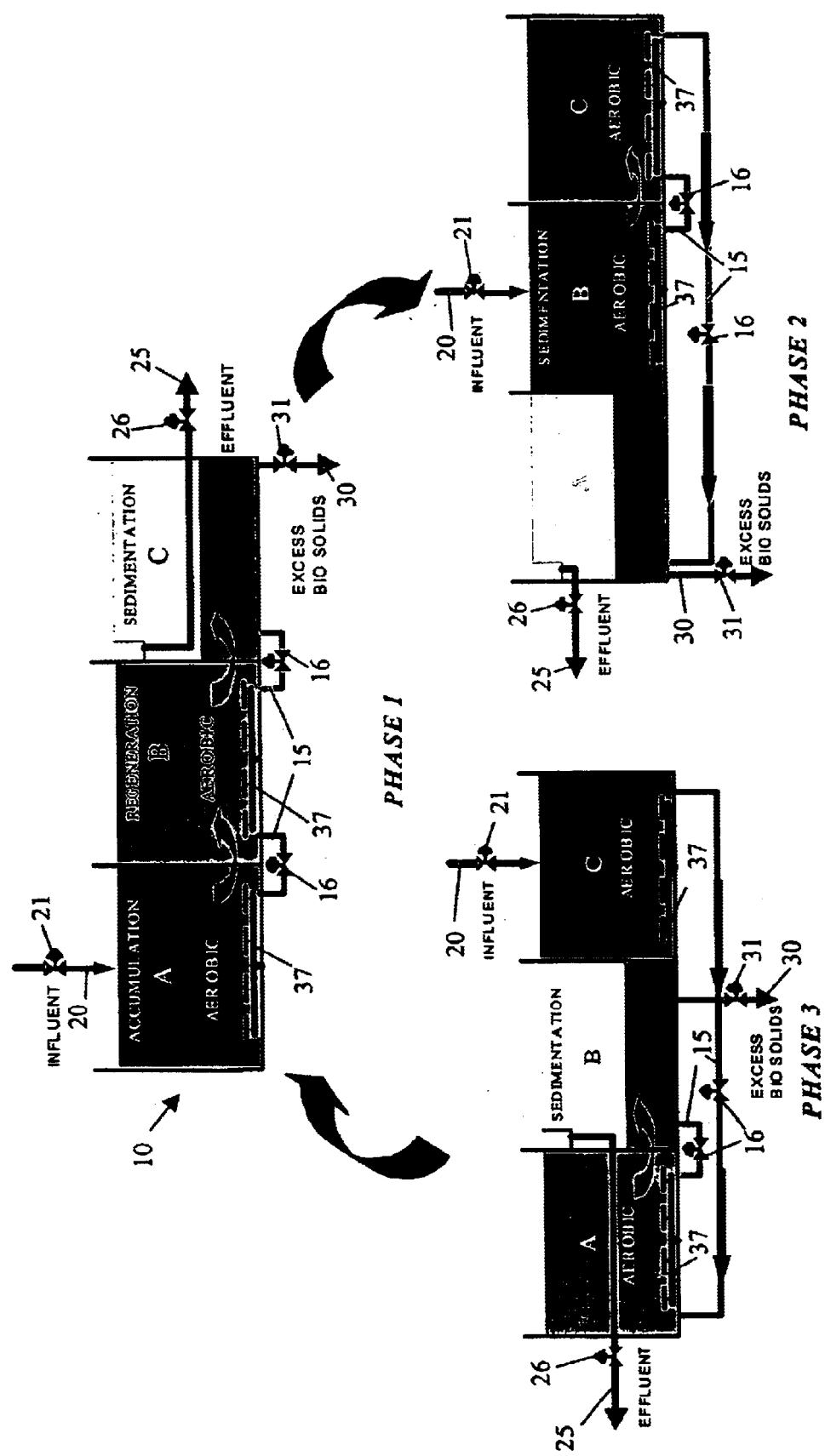
FIG. 29 is a diagrammatic illustration of main phases of an alternative functional cycle of a preferred 3-unit embodiment according to the present invention, used for accumulation-regeneration and carbon removal.
Figure 30:
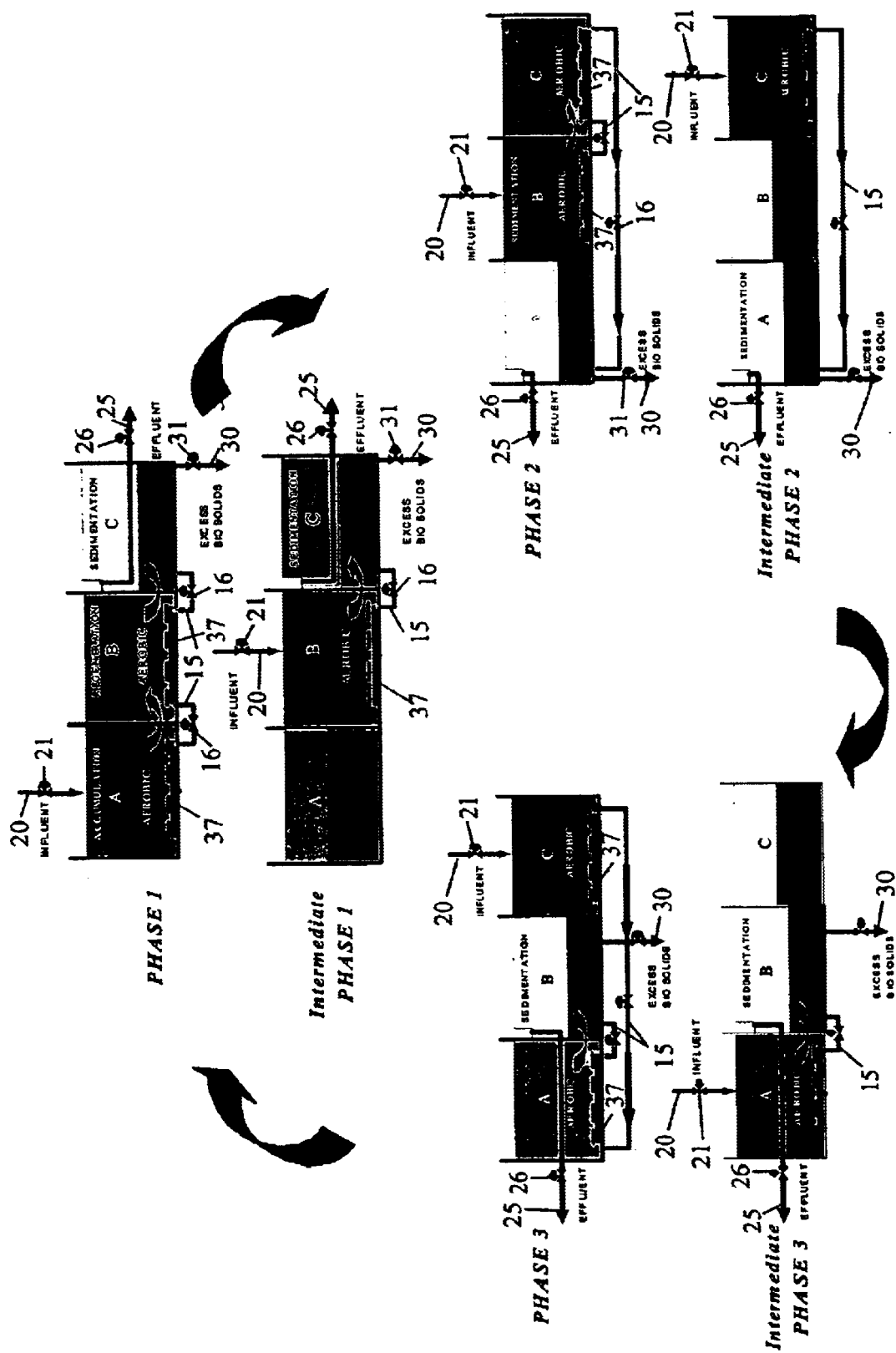
FIG. 30 is a diagrammatic illustration of main and intermediate phases of an alternative functional cycle of a 3-unit embodiment according to the present invention, used for accumulation-regeneration and carbon removal.
Figure 31:
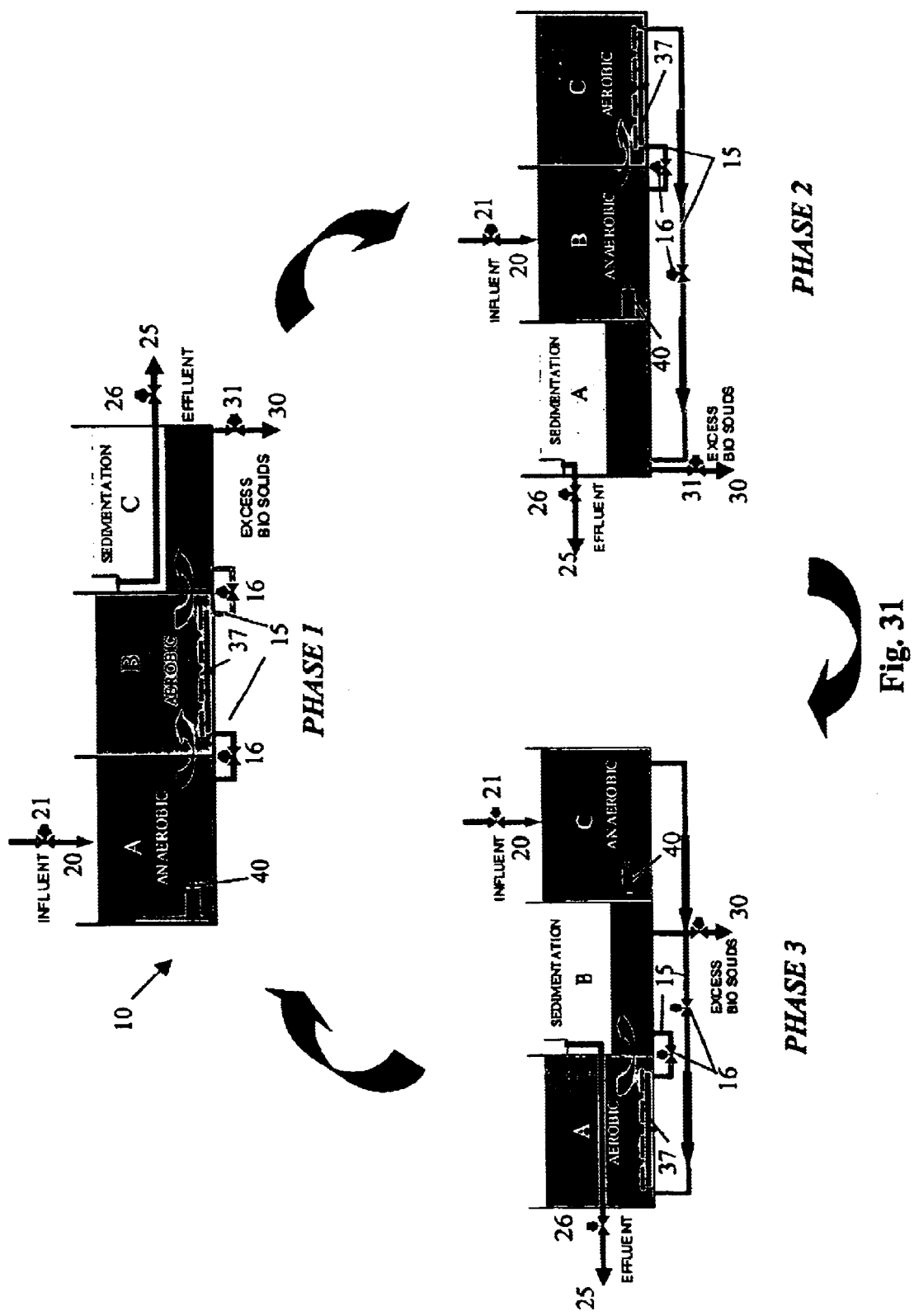
FIG. 31 is a diagrammatic illustration of an alternative functional cycle of a preferred 3-unit embodiment according to the present invention, used for phosphorus and carbon removal.

FIG. 31 shows an example of the main phases of the alternative functional cycle for biological phosphorus removal, whereby the difference with the functional cycle of FIG. 29 is that wastewater is treated anaerobically in the compartments where influent is fed in. Mixing means 40 are provided in each compartment for stirring the mixture.

Figure 32:
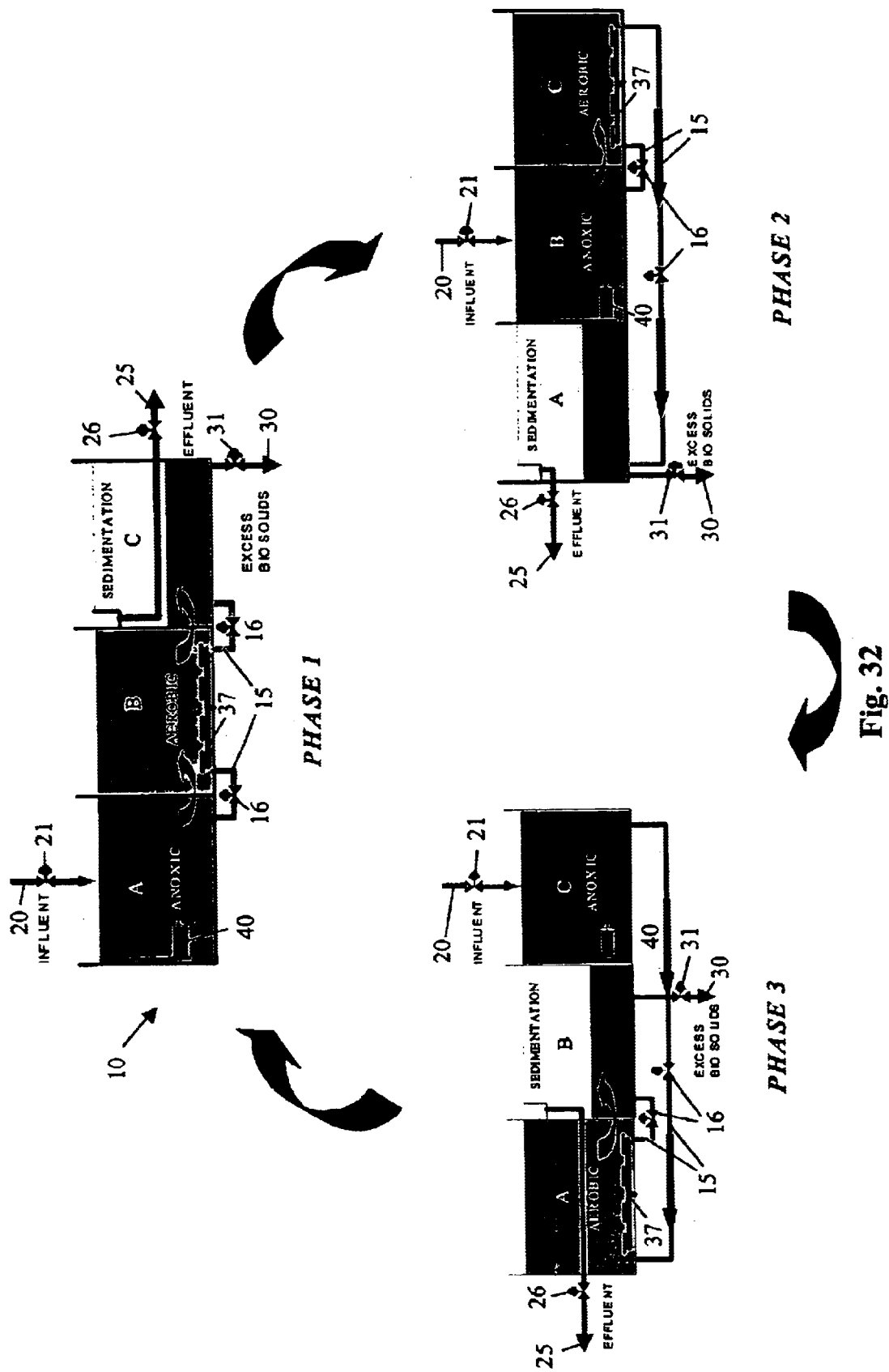
FIG. 32 is a diagrammatic illustration of an alternative functional cycle of a preferred 3-unit embodiment according to the present invention, used for nitrogen and carbon removal.

FIG. 32 shows an example of the main phases of the alternative functional cycle for biological nitrogen removal, whereby the difference with the functional cycle of FIG. 29 is that wastewater is treated anoxically in the compartments where influent is fed in. Mixing means 40 are provided in each compartment for stirring the mixture.

Figure 33:
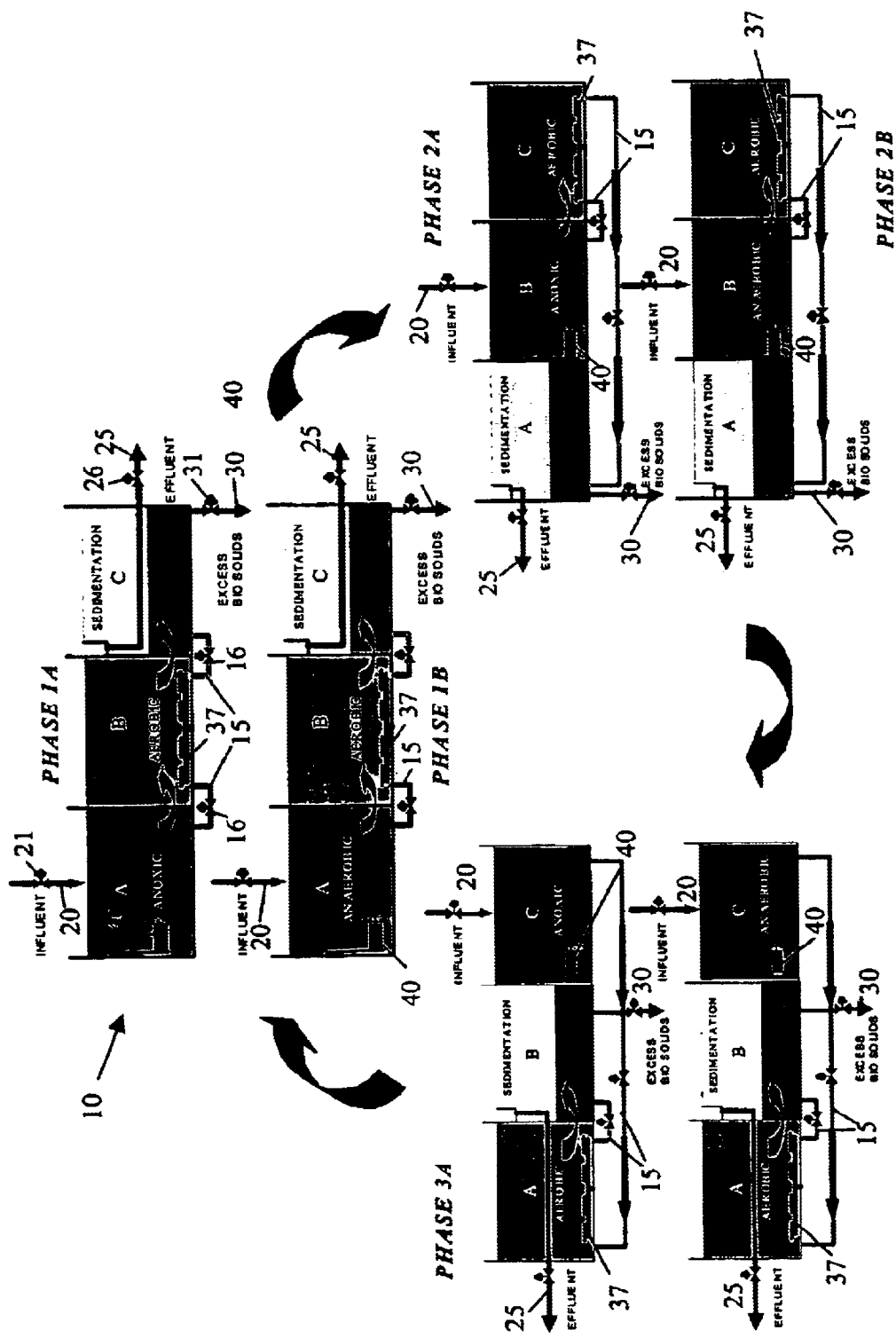
FIG. 33 is a diagrammatic illustration of an alternative functional cycle of a preferred 3-unit embodiment according to the present invention, used for nutrient and carbon removal.

FIG. 33 shows an example of the main phases of an alternative functional cycle for combined biological nitrogen and phosphorus removal. Each main phase consists of two subphases, during which fed in wastewater is subsequently treated anoxically and anaerobically.

It is to be noted that, within the concept of the showed preferred functional cycles, variations are allowed for the alternation between aerated (aerobic) and stirred (anoxic and anaerobic) active compartments. This means that within the said main phases or intermediate phases the active compartments can be alternated as often as necessary between these aerated and stirred states. Also simultaneous aeration or stirring of the active compartments is allowed to enhance or optimise biological nutrient removal.

$3^{rd}$ Embodiment: Alternative 4-unit Embodiment

Figure 3:
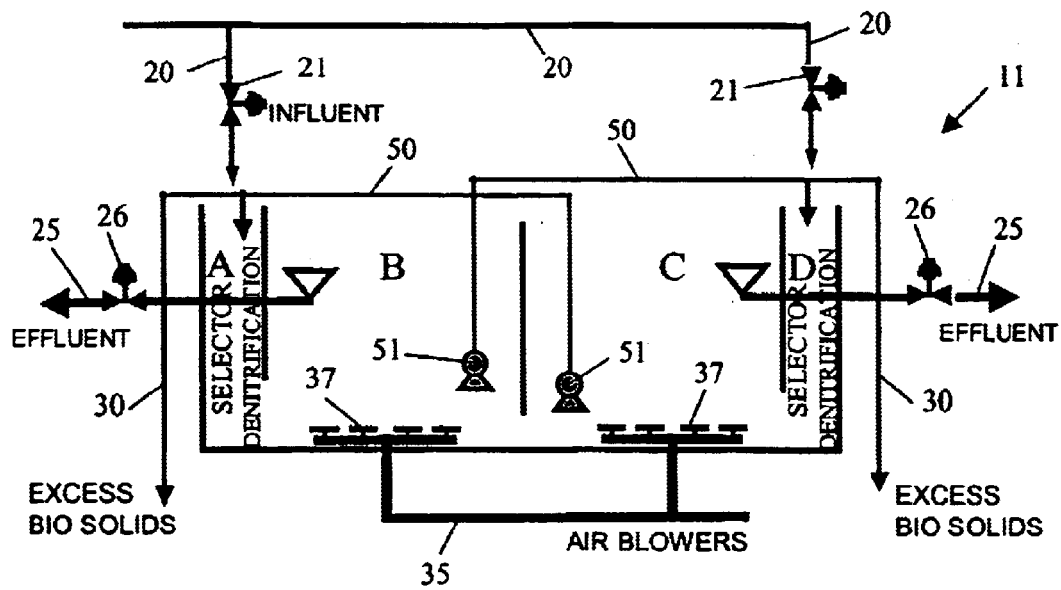
FIG. 3 is a hydraulic scheme of an alternative 4-unit embodiment according to the present invention.

FIG. 3 shows a hydraulic scheme of an aerobic biological reactor 11 of an alternative 4-unit embodiment. An alternative 4-unit embodiment comprises four interconnected compartments A, B, C, D, two outer compartments A and D, and two inner compartments B and C. Both outer compartments A, D and both inner compartments B, C are identical. The outer compartments A, D have approximately only $\frac{1}{5}^{th}$ till $\frac{1}{3}^{rd}$ of the volume of the inner compartments B, C.

The alternative 4-unit embodiment comprises also two internal sludge recirculation means 50, one from each inner compartment B, C to a non-adjacent of the outer compartments A, D. A recycle pump 51 is provided on each internal sludge recirculation means 50, and is also used for waste sludge removal from the inner compartments B, C when they are in sedimentation.

The reactor volume and the level in the tanks are substantially constant, but small level differences (less than 20 cm) may be acceptable in certain cases.

Influent can be directed to both outer compartments A, D by means of influent feeding means 20. Effluent can be discharged from both inner compartments B, C by means of effluent discharging means 25.

Inlets and outlets can automatically be closed or opened by driving them by a control unit such as a PC, a PLC, an FPGA, etc.

The hydraulic connections between the compartments are open.

For both municipal and industrial wastewater treatment this alternative 4-unit embodiment has a continuous influent feeding and a continuous effluent discharge.

Said alternative 4-unit continuous, constant level, hybrid cyclic operating system operates according to a symmetric functional cycle (cyclic operation), that allows successive biological treatment and sedimentation in a single reactor (reaction and sedimentation are separated in time).

The outer compartments A, D and inner compartments B, C of the alternative 4-unit embodiment follow the same cycle, which presents two main phases and two intermediate phases.

During each of the main phases, two compartments (an outer and an inner compartment) are active and two compartments (an outer and an inner compartment) are in sedimentation. Influent is added in the outer active compartment by influent feeding means 20, and effluent leaves the inner sedimentation compartment by effluent discharging means 25. Sludge is recycled from the inner sedimentation compartment to the outer active compartment by sludge recirculation means 50.

The active and fed outer compartments are always anoxic or anaerobic. The active inner compartment is generally aerobic. However, to enhance biological nutrient removal the active inner compartments may be alternatively stirred by mixing means (not represented) or aerated by aeration means 37 connected to an air blowers (not represented).

The time of the main phases is always maximised, but depending on the hydraulic loading of the system (highly depending on concentration of the wastewater), since this determines the sludge transport from the fed compartment in the direction of the sedimentation compartment. Before the sludge concentration becomes too low in the fed compartment and too high in the sedimentation compartment the flow direction will be reversed by shifting to the next main phase via an intermediate phase. Next to this sludge distribution limit there is also a limited duration for the retention of the thickened sludge in the sedimentation compartment. After a certain time it must be regenerated (aerated) to be able to restore its biodegradation capacity.

During the intermediate phases one outer compartment is active, the in the former main phase active inner compartments is transferred to sedimentation compartment and the sedimentation compartment of the former main phase still stays sedimentation compartment till the end of the intermediate phase.

The duration of the intermediate phase is always minimised and the time needed is depending on the sludge sedimentation velocity. The better the sedimentation capacity, the shorter the intermediate phase and the higher the active time (= treatment capacity) of the system.

During main phases and intermediate phases of the functional cycle of the alternative 4-unit embodiment, the influent feeding is alternatively directed to the two outer compartments (A, D, A, D, A, etc.).

The sludge/water mixture transport, during main phases and intermediate phases, from compartment to compartment, is alternatively a flush forwards and a flush backwards (A, B, C, D→D, C, B, A→A, B, C, D→D, C, B, A→etc.).

The internal sludge recirculation (including sludge waste line) is, during main phases alternatively from compartment C to A (waste sludge from C) and from compartment B to D (waste sludge from B) and back from C to A and so on. The internal sludge recirculation from the middle to the outer compartments controls the sludge distribution and create a combined selector and denitrification compartment.

Hereafter the two main phases are described. Between every two main phases, an intermediate phase takes place.

Figure 22:
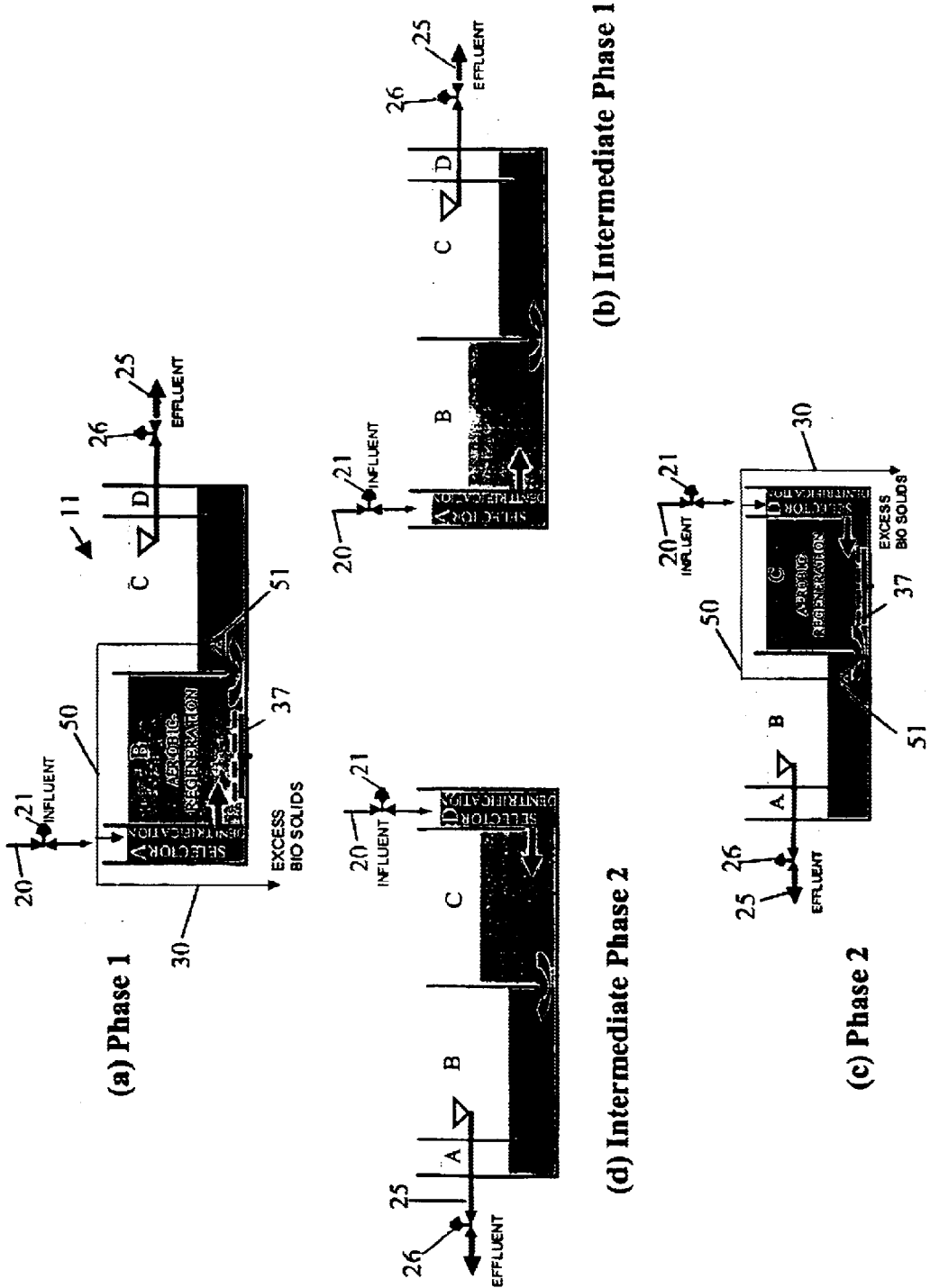
FIG. 22 is a diagrammatic illustration of a functional cycle of an alternative 4-unit embodiment according to the present invention, used for nitrogen and carbon removal.

Main Phase 1:

As represented in FIG. 22a, wastewater (influent) is pumped into compartment A by influent feeding means 20. The aerated and/or mixed influent-sludge mixture is flowing from compartment A to B, C and D. From C it is partly recycled back to compartment A by sludge recirculating means 50 and partly wasted by sludge discharging means 30. In compartment C, the mixed liquor is separated from the treated effluent by gravitational sedimentation, by flotation or by any other method. The treated effluent or supernatant of compartment C is finally discharged via effluent discharging means 25 such as an effluent weir to an effluent pit.

During this main phase, compartments A and B are active, and compartments C and D are in sedimentation.

Intermediate Phase 1:

During the preparation of compartment B as new sedimentation tank, the influent is still directed to compartment A by influent feeding means 20. The influent-sludge mixture is transported from compartment B towards C and D. Effluent is still released from compartment C by effluent discharging means 25. The internal recirculation from C to A is stopped to minimise disturbance of the sludge sedimentation in progress in compartment B. This is shown in FIG. 22b.

Main Phase 2:

The wastewater (influent) is pumped into compartment D by influent feeding means 20, as shown in FIG. 22c. The aerated and/or mixed influent-sludge mixture is flowing from compartment D to C, B and A. From compartment B, sludge is partly recycled back to compartment D by sludge recirculation means 50 and partly wasted by sludge discharging means 30. In compartment B, the mixed liquor is separated from the treated effluent by gravitational sedimentation, by flotation or by any other method. The treated effluent or supernatant of compartment B is finally discharged via effluent discharging means 25 such as an effluent weir to an effluent pit.

Intermediate Phase 2:

During the preparation of compartment C as new sedimentation tank, the influent is still directed to compartment D by influent feeding means 20, and the influent-sludge mixture is transported from compartment C towards B and A. Effluent is still released from compartment B by effluent discharging means 25. The internal recirculation from B to D is stopped to minimise disturbance of the sludge sedimentation in progress in compartment C.

Principle advantage of this embodiment is the simplicity in operation and construction for small scale systems and the combined selector-denitrification function of the outer compartments. Indeed, due to the recirculation of sludge to the outer compartments, there is a high substrate/sludge ratio, combined with anoxic circumstances for optimal denitrification.

4$^{th}$ Embodiment: Alternative 3-unit Embodiment

Figure 4:
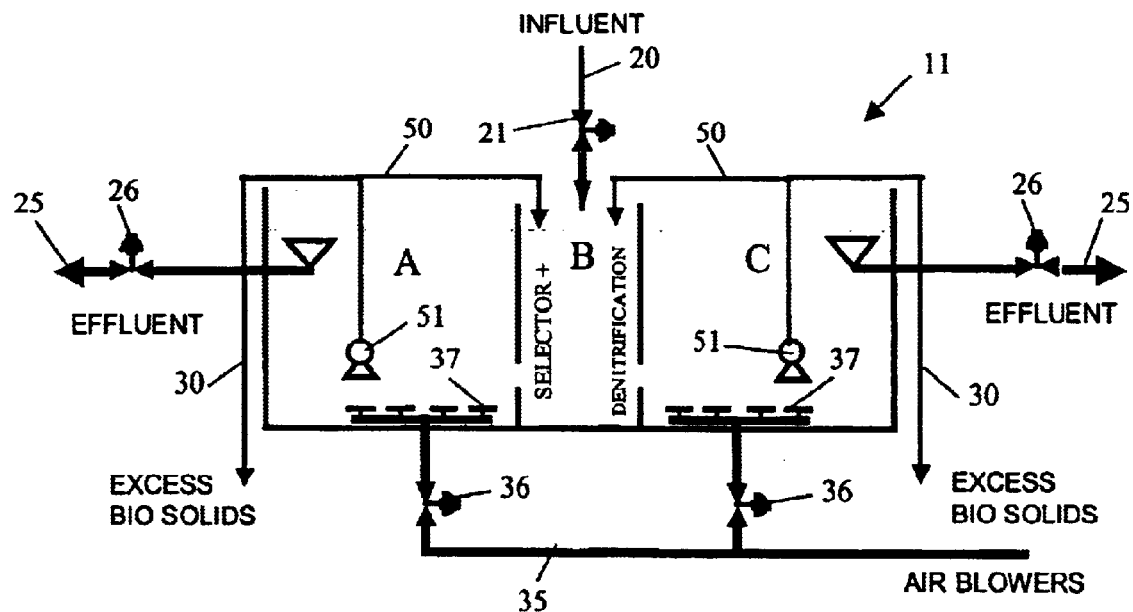
FIG. 4 is a hydraulic scheme of an alternative 3-unit embodiment according to the present invention.

FIG. 4 shows a hydraulic scheme of an alternative 3-unit aerobic biological reactor 11. It comprises three interconnected compartments A, B, C, two outer compartments A, C and a middle compartment B. Both outer compartments A, C are identical and the middle compartment B has approximately only $\frac{1}{5}^{th}$ to $\frac{1}{3}^{th}$ of the volume of each of the outer compartments A, C.

The biological reactor 11 according to this alternative embodiment comprises also two internal sludge recirculation means 50, one from each outer compartment A, C to the middle compartment B. Recycle pumps 51 are provided on each of the internal sludge recirculation means 50. These pumps 51 are also used for waste sludge removal from the outer compartments A, C when they are in sedimentation.

The reactor volume and the level in the tanks are constant.

Influent is always directed to the middle compartment B by influent feeding means 20.

Effluent can be discharged from both outer compartments A, C by means of effluent discharging means 25, when these compartments A, C are in sedimentation.

Inlet, outlets and sludge valves may be automatically closed or opened by driving them by a control unit such as a PC, a PLC, an FPGA, etc.

The hydraulic connections between the compartments are open.

For both municipal and industrial wastewater treatment the system has a continuous influent feeding and a continuous effluent discharge.

Said alternative 3-unit continuous, hybrid cyclic operating system operates according to a symmetric functional cycle (cyclic operation), that allows successive biological treatment and sedimentation in a single reactor (reaction and sedimentation separated in time). The outer compartments A, C and middle compartment B of the alternative 3-unit embodiment follow the same cycle.

There are two main phases and two intermediate phases. During the main phases, two compartments are active and one compartment is in sedimentation. Influent is always added in the middle compartment and effluent leaves the one of the outer compartments which is in sedimentation. Sludge is recycled from the outer sedimentation compartment to the fed middle compartment.

The active and fed middle compartment is always anoxic or anaerobic. The active outer compartment is normally aerobic. However to enhance biological nutrient removal the active outer compartments may be alternately stirred and aerated.

The time of the main phases is always maximised, depending on the hydraulic loading of the system (which is highly depending on concentration of the wastewater), since this determines the sludge transport from the fed compartment in the direction of the sedimentation compartment. Before the sludge concentration becomes too low in the fed compartment and too high in the sedimentation compartment the flow direction will be changed by shifting to the next main phase via the intermediate phase. Next to this sludge distribution limit there is also a limited duration for the retention of the thickened sludge in the sedimentation compartment. After a certain time it must be regenerated (aerated) to be able to restore its biodegradation capacity.

During the intermediate phases, one outer compartment is active, the in the former main phase active outer compartments is transferred to sedimentation compartment and the sedimentation compartment of the former main phase still stays sedimentation compartment till the end of the intermediate phase.

The duration of the intermediate phases is always minimised, the time needed being depending on the sludge sedimentation velocity. The better the sedimentation capacity, the shorter the intermediate phase and the higher the active time (=treatment capacity) of the system.

The influent feeding is always directed to the middle compartment B.

The sludge/water mixture transport, during main phases and intermediate phases, from compartment to compartment, is a flush forwards and a flush backwards, combined with a internal recirculation (B, A, C→B, C, A→B, A, C→B, C, A→etc.).

The internal sludge recirculation is, during main phases and intermediate phases, alternatively from compartment A to B and from C to B and back from A to B and so on. The internal sludge recirculation from the outer compartments to the middle compartment controls the sludge distribution and creates a combined selector and denitrification compartment.

Excess sludge is at the same time discharged from C, respectively from A and so on.

Figure 34:
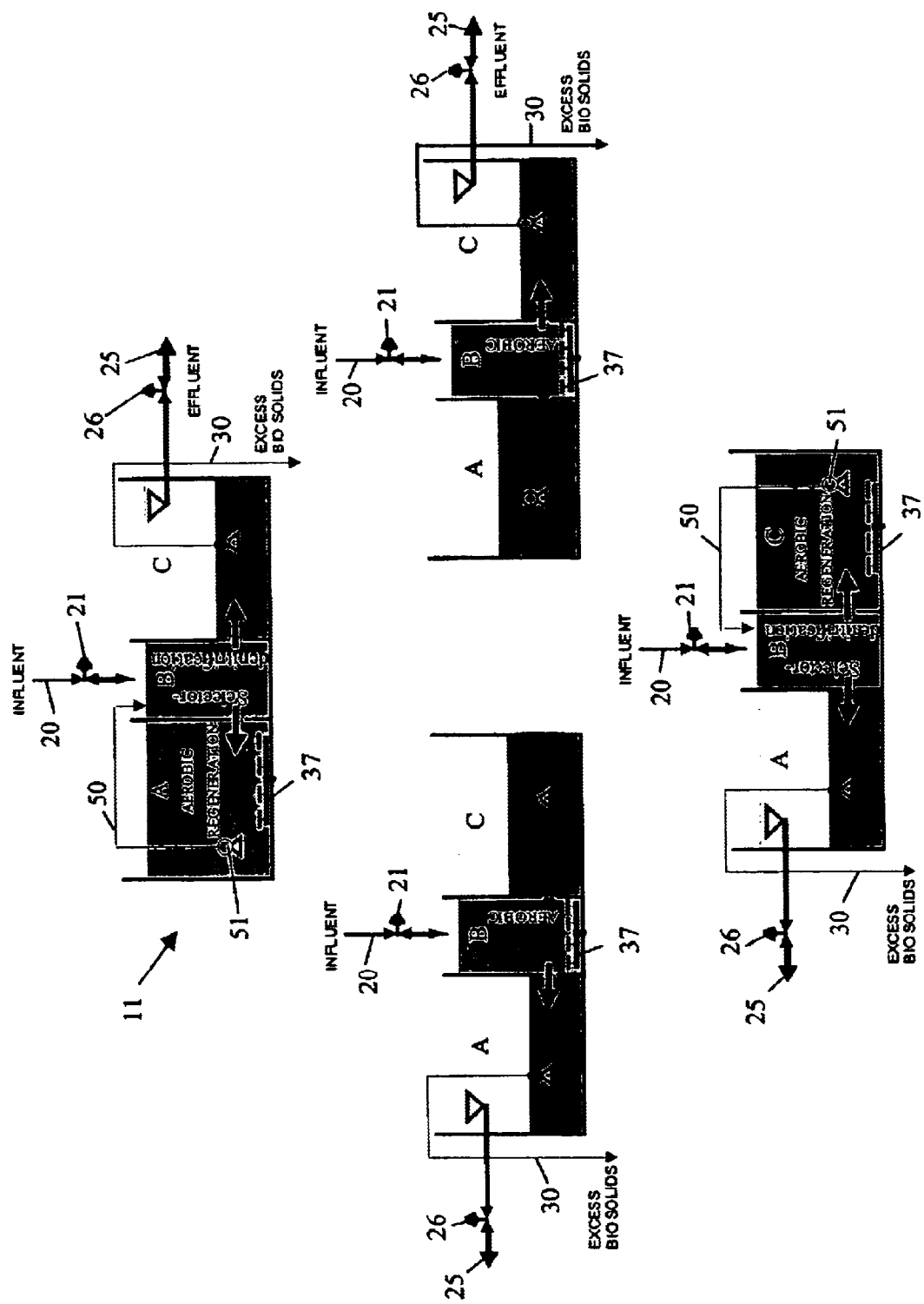
FIG. 34 is a diagrammatic illustration of a functional cycle of an alternative 3-unit embodiment according to the present invention, used for nitrogen and carbon removal.

Hereafter the two main phases are described with respect to FIG. 34. Between every two main phases, an intermediate phase takes place.

Main Phase 1:

The wastewater (influent) is pumped into compartment B by influent feeding means 20. The aerated and/or mixed influent-sludge mixture is recycled from compartment A to B and finally it flows to C, where the mixed liquor is separated from the treated effluent by gravitational sedimentation, by flotation or by any other method. The treated effluent or supernatant of compartment C is discharged via effluent discharging means 25 such as an effluent weir to an effluent pit. Excess bio solids are discharged from compartment C via sludge discharging means 30.

Intermediate Phase 1:

During the preparation of compartment A as new sedimentation tank, the influent is still directed to compartment B by influent feeding means 20, and the influent-sludge mixture is transported from compartment B towards C. Effluent and excess bio solids are still released from compartment C by effluent discharging means 25 and sludge discharging means 30. The internal recirculation from A to B is stopped to minimise disturbance of the sludge sedimentation in progress in compartment A.

Main Phase 2:

The wastewater (influent) is still pumped into compartment B by influent feeding means 20. The aerated and/or mixed influent-sludge mixture is recycled from compartment C to B and finally it flows to A, where the mixed liquor is separated from the treated effluent by gravitational sedimentation, by flotation or by any other method. The treated effluent or supernatant of compartment A is discharged via effluent discharging means such as an effluent weir to an effluent pit. Also excess bio solids are discharged from compartment A by sludge discharging means 30.

Intermediate Phase 2:

During the preparation of compartment C as new sedimentation tank, the influent is still directed to compartment B by influent feeding means 20. The influent-sludge mixture is transported from compartment B towards A. Effluent and excess bio solids are still released from compartment A via effluent discharging means 25 and sludge discharging means 30. The internal recirculation from C to B is stopped to minimise disturbance of the sludge sedimentation in progress in compartment C.

This symmetric functional cycle is continuously repeated: phase 1, phase 2, phase 1, phase 2, etc.

Main advantage of this cycle is the simplicity in operation and construction for small scale systems and the combined selector-denitrification function of the middle compartment.

It is to be noted that, within the concept of the showed preferred functional cycle, variations are allowed for the alternation between aerated (aerobic) and stirred (anoxic and anaerobic) active compartments. This means that within the said main phases or intermediate phases the active compartments can be alternated as often as necessary between these aerated and stirred states. Also simultaneous aeration or stirring of the active compartments is allowed to enhance or optimize biological nutrient removal.

Both 3-unit and 4-unit alternative embodiments can typically be used for small scale municipal and industrial wastewater treatment application, with or without a holding tank. The typical application range of this configuration is 2.000 to 20.000 PE for municipal wastewater and 4.000 to 40.000 PE for industrial wastewater.

$5^{th}$ Embodiment: Combination of Single Stage Systems

Combinations of single stage systems in parallel or in series are used when highly loaded and/or toxic wastewaters should be treated.

Figure 5:
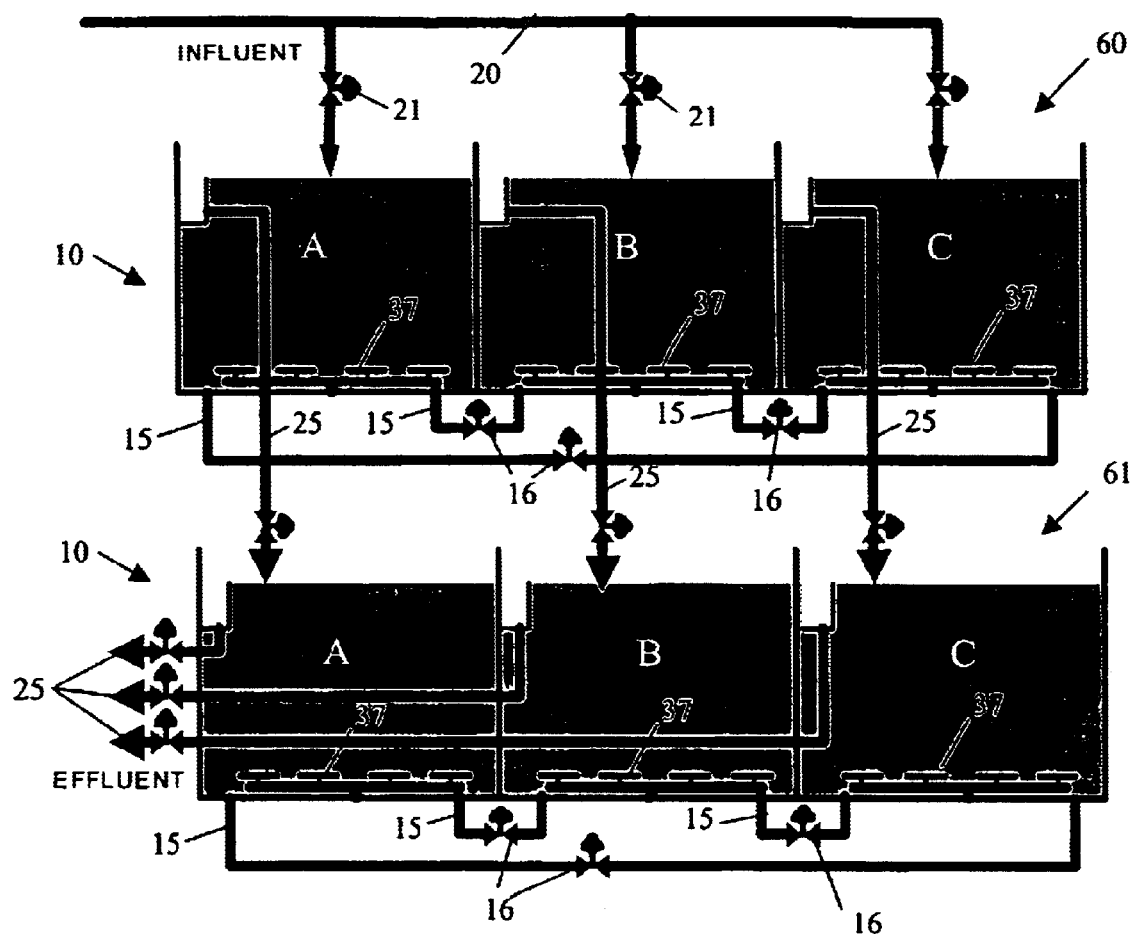
FIG. 5 is a hydraulic scheme of a combination in series of two 3-unit embodiments according to the present invention.

A first combination of single stage systems forms a two stage system by combining in series e.g. the 4-unit or 3-unit embodiments previously described. Two stage configurations of the 4-unit and 3-unit embodiments can be selected in case of highly concentrated, toxic and difficult biodegradable wastewaters. An example of a two stage system formed by connecting in series two 3-unit embodiments of FIG. 2, is represented in FIG. 5. A high loaded first stage 60 is followed by a low loaded second stage 61. The two stage system may also be operated in parallel because of its redundant properties. The first stage 60 operates as described above for the preferred 3-unit embodiment. Effluent discharged from the first stage 60 by effluent discharging means 25 forms the influent of the second stage 61.

Special advantages are the compact system, the first stage 60 that forms a buffer against toxic components and an overload protection of the second stage 61, and the selection of bacteria in the second stage 61 which are specialised in the breakdown of difficult biodegradable components.

An alternative two stage treatment system is formed by the combination of a first stage anaerobic pre-treatment reactor 62 (e.g. a generic Upflow Anaerobic Sludge Blanket reactor) in series with one of the 4-unit or 3-unit embodiments explained above.

Figure 6:
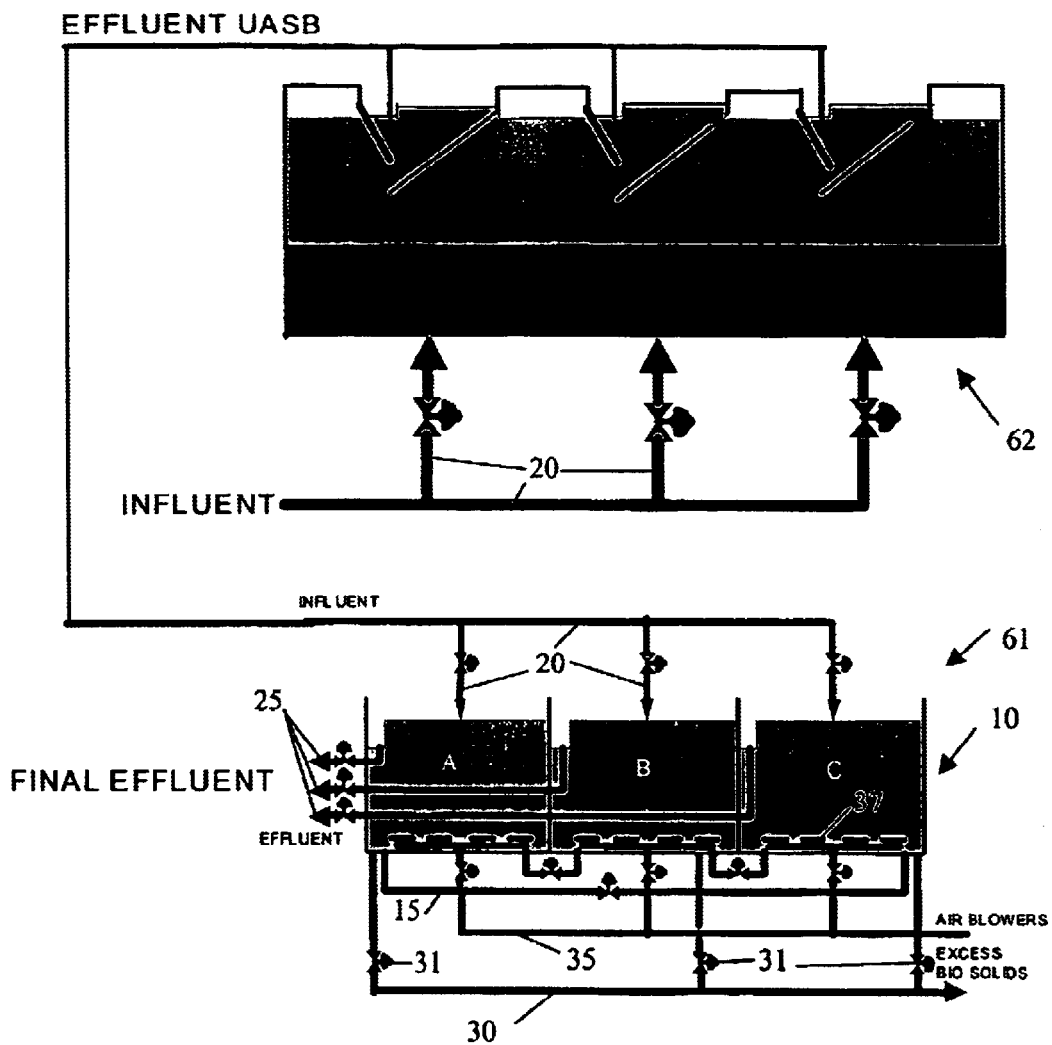
FIG. 6 is a hydraulic scheme of a combination in series of an anaerobic pretreatment with a 3-unit embodiment according to the present invention.

Two stage configurations of an anaerobic pre-treatment reactor with the 4-unit or 3-unit embodiments can be used for the treatment of wastewaters that contain high concentrations easily biodegradable organic compounds. The anaerobic pre-treatment reactor 62 is then used to reduce the organic load with 80–95%, while the 4-unit or 3-unit embodiments can be used to perform advanced biological nitrogen and phosphorus removal and to complete the removal of the organic compounds. Such a combination is represented in FIG. 6.

Special advantages are the compact system, the overall lower sludge production and the lower energy costs.

Figure 11:
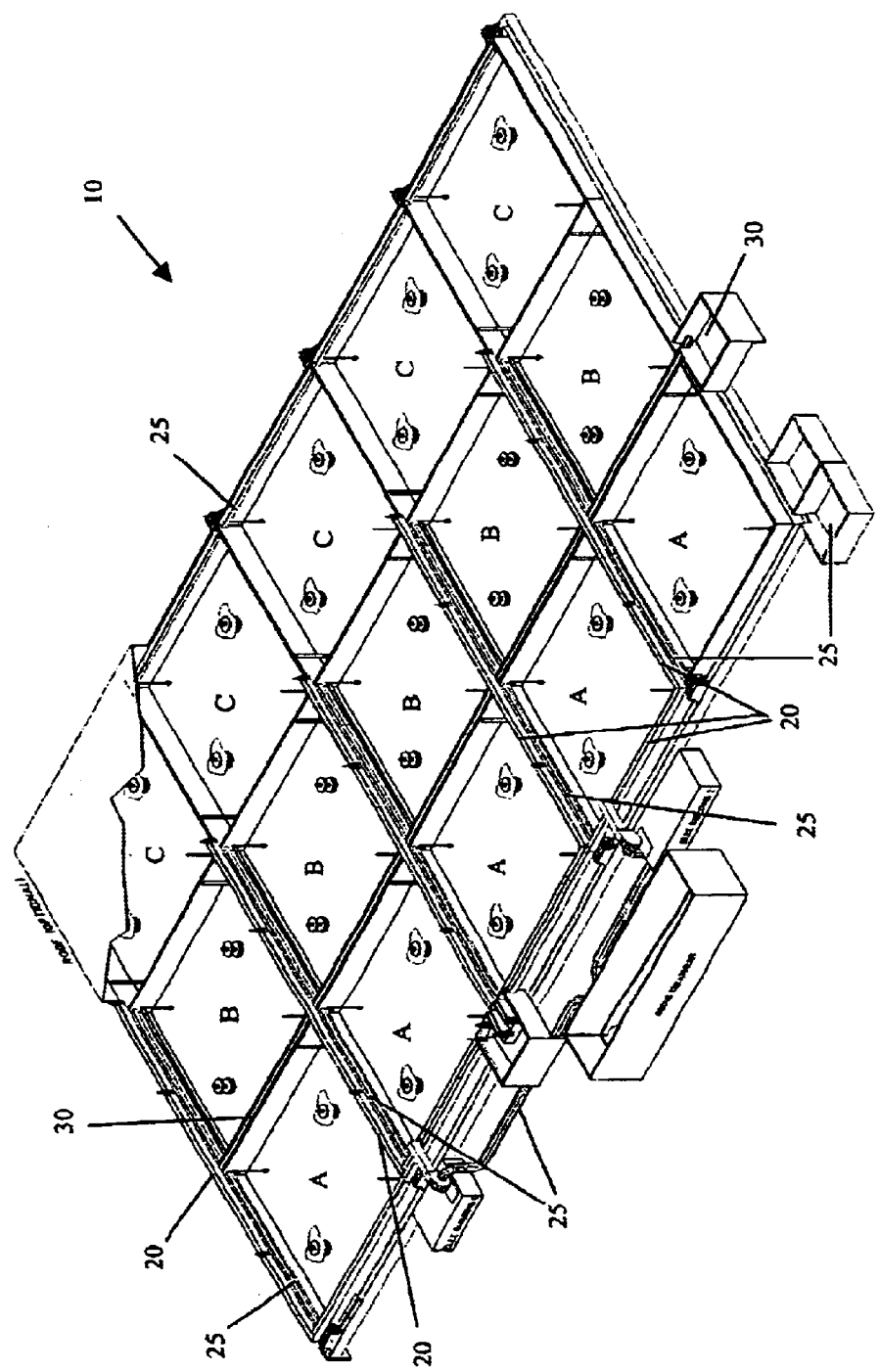
FIG. 11 shows a perspective view of a combination in parallel of five 3-unit embodiments according to the present invention.

Also parallel combinations of the described preferred 4-unit or 3-unit embodiments can typically be used for large scale municipal wastewater treatment, where two or more of said 4-unit or 3-unit embodiments of 100.000 PE (population equivalents—a flow-based unit of measurement used to indicate sewage load; a flow of 240 liters per day is usually defined as one PE) are used. Also in cases of needed extensions of a wastewater treatment plant, parallel combination of said 4-unit or 3-unit embodiments can be used. A perspective view of a parallel combination of five 3-unit embodiments is shown in FIG. 11.

$6^{th}$ Embodiment: Membrane/DAF Bioreactor

As previously mentioned, in the described systems, the gravitational sedimentation function can be replaced by a dissolved airflotation (DAF) system or by microfiltration or ultrafiltration systems (also called a membrane bioreactor).

All described 4-unit and 3-unit embodiments can be combined with internal or external microfiltration, ultrafiltration membrane units or DAF-units that replace the sludge separation by gravity. In such a configuration, all compartments of the said 4-unit and 3-unit embodiments are always active and therefore capacity is increased with more than 25% for the 4-unit embodiment and more than 33% for the 3-unit embodiment.

For a membrane bioreactor or DAF 4-unit or 3-unit embodiment, the sludge mixture transported to the membranes is coming from an active aerated compartment, and the concentrate from the membranes is always recycled back to the same actual aerated compartment. The permeate of the membranes is discharged as highly purified effluent.

Figure 9:
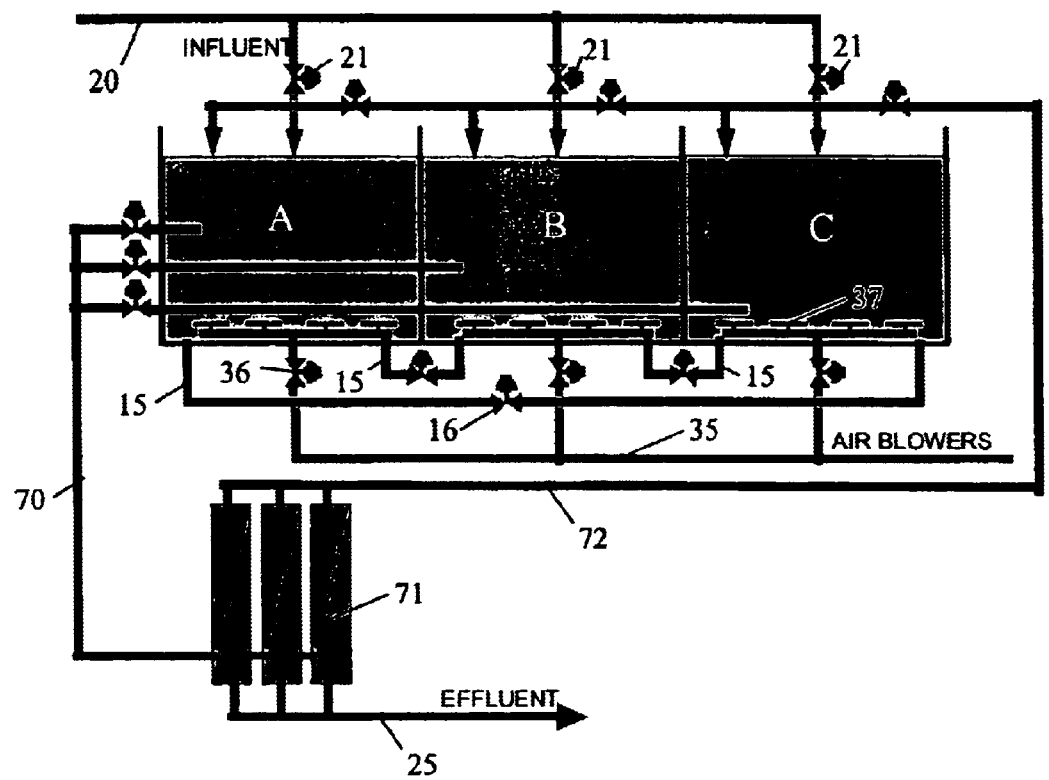
FIG. 9 is a hydraulic scheme of a membrane bioreactor-3-unit embodiment.

The sludge from the aerated compartment is always pumped to the membranes because the turbulences cause a lesser fouling of the membranes. The concentrate is pumped back to the same aerated compartment to avoid sludge distribution problems. The oxygen content of the sludge may also increase due to extra oxygen input in the membranes to avoid biofouling and therefore should not enter an anoxic or anaerobic compartment. FIG. 9 shows a typical membrane/DAF bioreactor configuration of a 3-unit embodiment. Exactly the same principle can be followed for the 4-unit embodiment.

Influent is fed e.g. to compartment A by influent feeding means 20, by closing the valves 16 to compartments B and C. The aerated and/or mixed influent/sludge mixture is flowing from compartment A over compartment B to compartment C, which also is an active compartment. From compartment C, the sludge mixture is pumped via first pumping pipes 70 to a membrane 71, where sludge is split into effluent, discharged by effluent discharging means 25 and concentrate, pumped back to compartment C via second pumping pipes 72.

A symmetric functional cycle as previously described is then followed.

Special advantages of this embodiment are an increased treatment capacity and in case of the membrane filtration the very high suspended solids removal.

$7^{th}$ Embodiment: Further Treatments

All described embodiments can be combined with an integrated sludge dewatering and treatment system, like sludge stabilisation, gravitational sludge thickening with recycle to stabilisation and mechanical sludge dewatering and sludge stockage.

All described embodiments can also be combined with physico chemical pre-treatment, post-treatment or simultaneous treatment that may be necessary to enhance biodegradation, reduce toxicity or optimise treatment efficiencies.

Described systems can be equipped with a biological (biofiltration) or physico-chemical off-gas treatment system, to treat off-gases from especially a buffertank (containing untreated wastewater) and a sludge dewatering building, where anaerobic conditions can occur. The biofiltration facility can be easily integrated in a compact and covered embodiment. All covered volumes can be ventilated and the ventilated exhaust air can be led into the biofiltration system.

All described embodiments can furthermore be equipped with an external selector, in which influent is always fed in and from which effluent forms influent for one of the described embodiments. In a selector, high substrate to sludge ratio is effective, which promotes well settling flock-forming bacteria. The alternative 4-unit and 3-unit embodiments are already equipped with an internal selector (which simultaneously has a denitrification function), as represented in FIG. 3 and FIG. 4.

Figure 10:
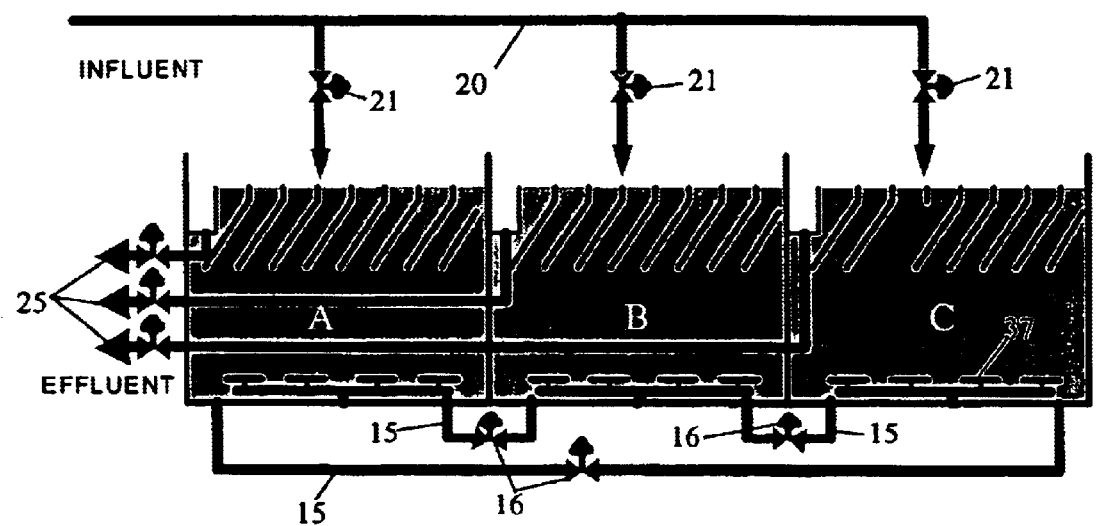
FIG. 10 is a hydraulic scheme of lamella/tube settlers in a 3-unit embodiment according to the present invention.

All described embodiments can also be equipped with a lamella/tube separator, in case of high hydraulically loaded systems. In case of deep tank systems lamella/tube settlers may be applied in each tank to cope with a high hydraulic surface loading in the compartment that is in sedimentation mode. Tube settler plates allow for higher hydraulic loading by increasing the distance towards the effluent weir, and by forming a barrier for sludge to the effluent weir, so that sludge is optimally retained in the reactor instead of polluting the effluent. Due to the functional cycle, a special cleaning effect is obtained. After a sedimentation phase, the attached particles or other substances (sludge, suspended solids, algae) attached to the lamella settlers are removed during the following aerated (turbulent) phase. FIG. 10 shows lamella settlers installed in every unit of a 3-unit embodiment.

$8^{th}$ Embodiment: Storm Weather Functional Cycle

In case of storm weather flow at municipal plants, the described preferred 3-unit or 4-unit systems can be operated with double sedimentation capacity to cope with the hydraulic peak loading.

This cycle is automatically started by a control system such as a PC, a PLC, a PGA or any other control system, based on a flow rate measurement and can be initiated from every main phase or intermediate phase.

To maintain the same sludge distribution as during the normal dry weather flow, the sequence time between the phases is automatically recalculated (shortened) when in storm weather mode.

Figure 23:
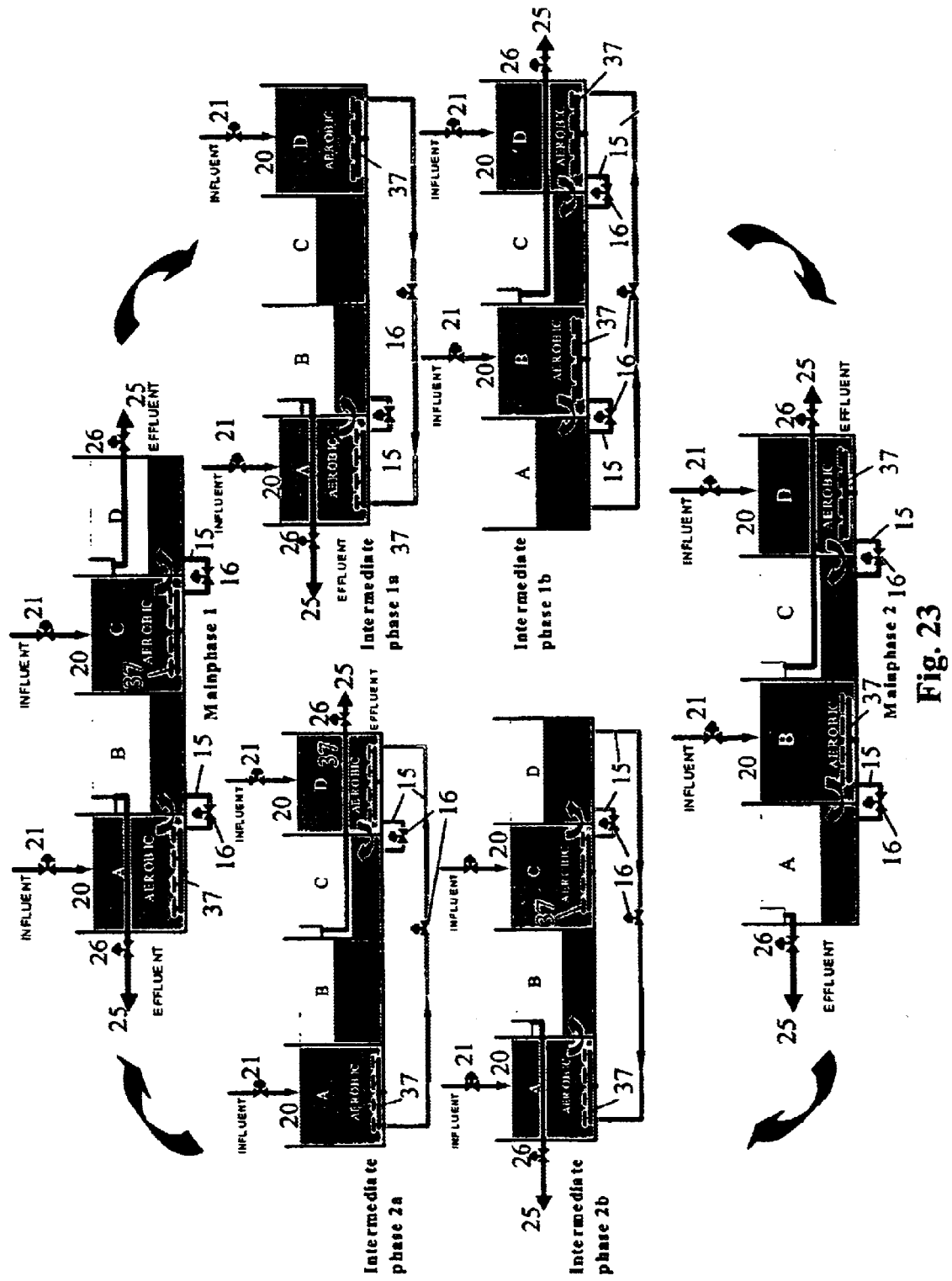
FIG. 23 is a diagrammatic illustration of a storm weather functional cycle of a preferred 4-unit embodiment according to the present invention, used for carbon removal.

Hereafter a typical part of the Storm Weather Flow cycle is described for a preferred 4-unit embodiment, with regard to FIG. 23:

Main Phase 1:

The wastewater (influent) is pumped into compartments A and C by influent feeding means 20. The aerated and/or mixed influent-sludge mixture is flowing from A to B and from C to D. Compartments B and D are functioning as sedimentation compartments. The mixed liquor is separated in effluent and thickened sludge and equal parts of effluent are discharged from B and D via effluent discharging means 25. Compartments A and B are hydraulically connected, and compartments C and D are hydraulically connected.

Intermediate Phase 1a:

The wastewater (influent) is pumped into compartments A and D by influent feeding means 20. The aerated and/or mixed influent-sludge from D and A arrives in compartment B, that is functioning as sedimentation compartment and where effluent continues to leave the system via effluent discharging means 25. Compartment C is idle to prepare as sedimentation tank.

Intermediate Phase 1b:

The wastewater (influent) is pumped into compartments B and D by influent feeding means 20. The aerated and/or mixed influent-sludge mixture is flowing from B to A to D and C, that functions as the new sedimentation compartment and where effluent is discharged via effluent discharging means. In compartment A, the aeration is stopped to prepare as sedimentation compartment.

Main Phase 2:

The wastewater (influent) is pumped into compartments B and D by influent feeding means 20, where influent and sludge is aerated by aeration means and/or mixed by mixing means. The aerated and/or mixed influent-sludge mixture is flowing from B to A and from D to C. Compartments A and C are functioning as sedimentation compartments. The mixed liquor is separated in effluent and thickened sludge and equal parts of effluent are discharged from A and C by effluent discharging means.

Intermediate Phase 2a:

The wastewater (influent) is pumped into compartments A and D by influent feeding means 20. The aerated and/or mixed influent-sludge from A and D arrives in compartment C, that is functioning as sedimentation compartment and where effluent continues to leave the system via effluent discharging means 25. Compartment B is idle to prepare as sedimentation tank.

Intermediate Phase 2b:

The wastewater (influent) is pumped into compartments A and C by influent feeding means 20. The aerated and/or mixed influent-sludge mixture is flowing from C to D to A and B, that functions as the new sedimentation compartment and where effluent is discharged via effluent discharging means. In compartment D, the aeration is stopped to prepare as sedimentation compartment.

After the intermediate phases 2a and 2b, the cycle starts again with main phase 1.

Main advantage of this embodiment is that, during the main phases of this special functional cycle, the sedimentation capacity is doubled, while still having 50% of biodegradation capacity, which should be sufficient to handle the load of the diluted wastewater.

9$^{th}$ Embodiment: Accumulation-regeneration

Due to the symmetric functional cycle, every compartment of the reactor follows the same cycle of anoxic/anaerobic feeding, aerobic oxidation, nitrification and finally sedimentation.

During anoxic and/or anaerobic feeding, enzymatically induced absorption of organic material from the wastewater occurs by the sludge flocks. This is called the substrate accumulation phase. This process allows for the selection of flock forming bacteria, since these bacteria have a higher maximal substrate uptake rate and are thus favoured by the high initial substrate concentration during anoxic/anaerobic feeding.

The initial substrate concentration can even be increased by a non-mixed feeding, the dump-fill strategy.

In the next aerated phases and compartments, the absorbed substrates are further oxidised. The energy produced during the dissimilation processes is used for assimilation or cell reproduction processes. This is called the regeneration phase.

The whole process of alternation between accumulation and regeneration phases during the cyclic operation of the said embodiments can be compared with the function of a classical external selector, where high initial substrate concentrations are obtained in a separate high loaded compartment, where influent is mixed with the recirculated sludge.

The accumulation-regeneration feature of the said embodiments introduces therefore an integrated selector effect, because the selector effect is created in time and not in place (no hardware changes nor investments).

The above described selector properties can also be obtained by the introduction of a separate selector compartment. This may be necessary in some extreme cases and can easily be integrated in the said embodiments. This solution involves however the creation of a separate selector compartment, a sludge recycle pump and piping and valves and will therefore only be selected in extreme cases.

10$^{th}$ Embodiment: Enhanced Biological Nutrient Removal

The functional cycle can be excellently used for the introduction of enhanced biological nutrient removal.

Major control parameters with respect to the nutrient removal are the influent feeding position, duration of time and the alternation of the different biological states (anoxic, anaerobic and aerobic states), each of which will be described hereinafter.

Influent Feeding Position:

In general the fed compartment is used to implement anoxic and/or anaerobic phases when enhanced biological nitrogen and phosphorus removal are needed.

The initial anoxic or anaerobic feeding phases are very effective to start the biological nitrogen and phosphorus removal metabolism, since they follow on a previous sedimentation phase. The low initial redox potential guarantees that all easy biodegradable organic matter (BOD) is effectively used for the denitrification process and/or the anaerobic metabolism.

In cases of a low BOD/nutrients ratio, all BOD available is used for the nutrient removal and the consumption of an external BOD-source is therefore minimised. In cases of a high BOD/nutrients ratio, all BOD possible is used for the nutrient removal, which means that energy consumption for the final BOD oxidation is minimised.

Duration Time:

The functional cycle brings the control in time concept, which means that duration times for every single process can be optimised by a simple adaptation in the control program. This duration time adaptation can be introduced manually, based on laboratory analyses on sludge and effluent samples (e.g. nitrates, ammonia and phosphorus analyses).

It is also possible to use on-line measurements (redox potential and respiration rate) in combination with control algorithms that automatically adapt phase duration times.

Alternation of Process States:

The functional cycle allows for the optimal freedom of alternation between the typical phases for nutrient removal.

In general the pattern of alternation between anoxic, anaerobic and aerobic phases is depending on the nitrification, denitrification and phosphorus release and uptake rates. These reaction rates are depending on the specific nutrient-removing fraction of the activated sludge, the BOD, N, p-content and BOD/N/p-ratio of the wastewater and on important physical chemical parameters like temperature and pH.

Depending on above mentioned factors the alternation between anoxic, anaerobic and aerobic phases can be carried out only once till several times within one main or intermediate phase to obtain an optimal nutrient removal.

In case that no nitrates should be removed, alternation between anaerobic and aerobic phases can take place to complete biological phosphorus removal.

Alternation between anoxic and aerobic phases are carried out when only biological nitrogen removal is necessary.

The symmetric functional cycle is driven by a control unit which is part of a core connecting infrastructure. Said core connecting infrastructure, comprises interconnecting piping, automatic valves and monitoring and control equipment facilitating the said unique functional operation of the said described e.g. 4-unit and 3-unit embodiments.

The core connecting infrastructure is the central part of a water treatment plant because it drives the symmetric functional cycle of the said embodiments. Said core connecting infrastructure is preferably placed in the centre of the said 4-unit or 3-unit embodiments.

During the civil works a square concrete compartment or hull is erected in the centre of a concrete bottom plate. The concrete hull can be built e.g. from the bottom of the said 3-unit or 4-unit embodiments till about 0.5 to 1 meter above the water level. The core connecting infrastructure is then afterwards fitted in the concrete hull.

Figure 7A:
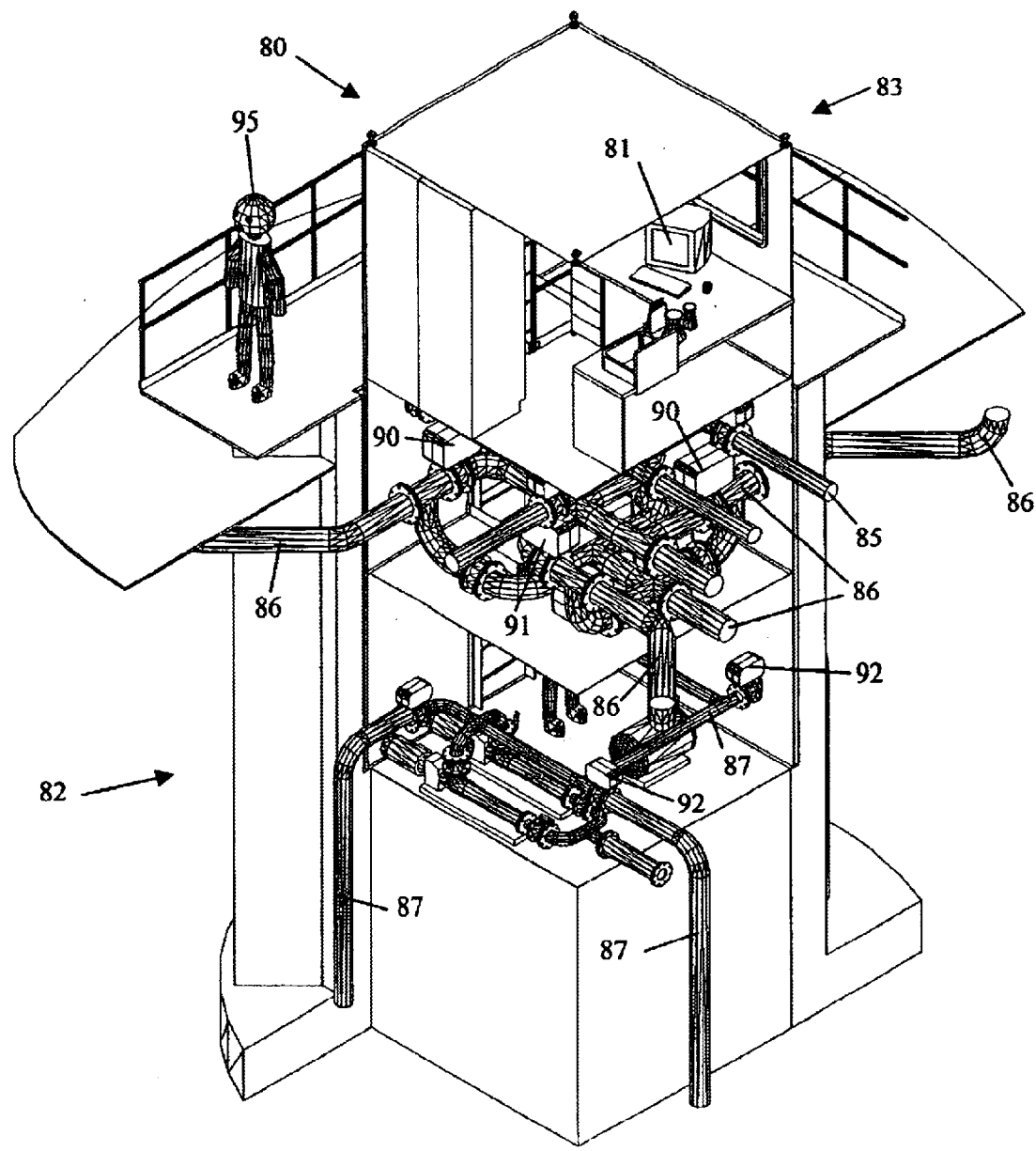
FIG. 7a is a perspective view and FIG. 7b is a front view of an arrangement of internals in a core connecting infrastructure comprising interconnecting piping, automatic valves and monitoring and control equipment.
Figure 7B:
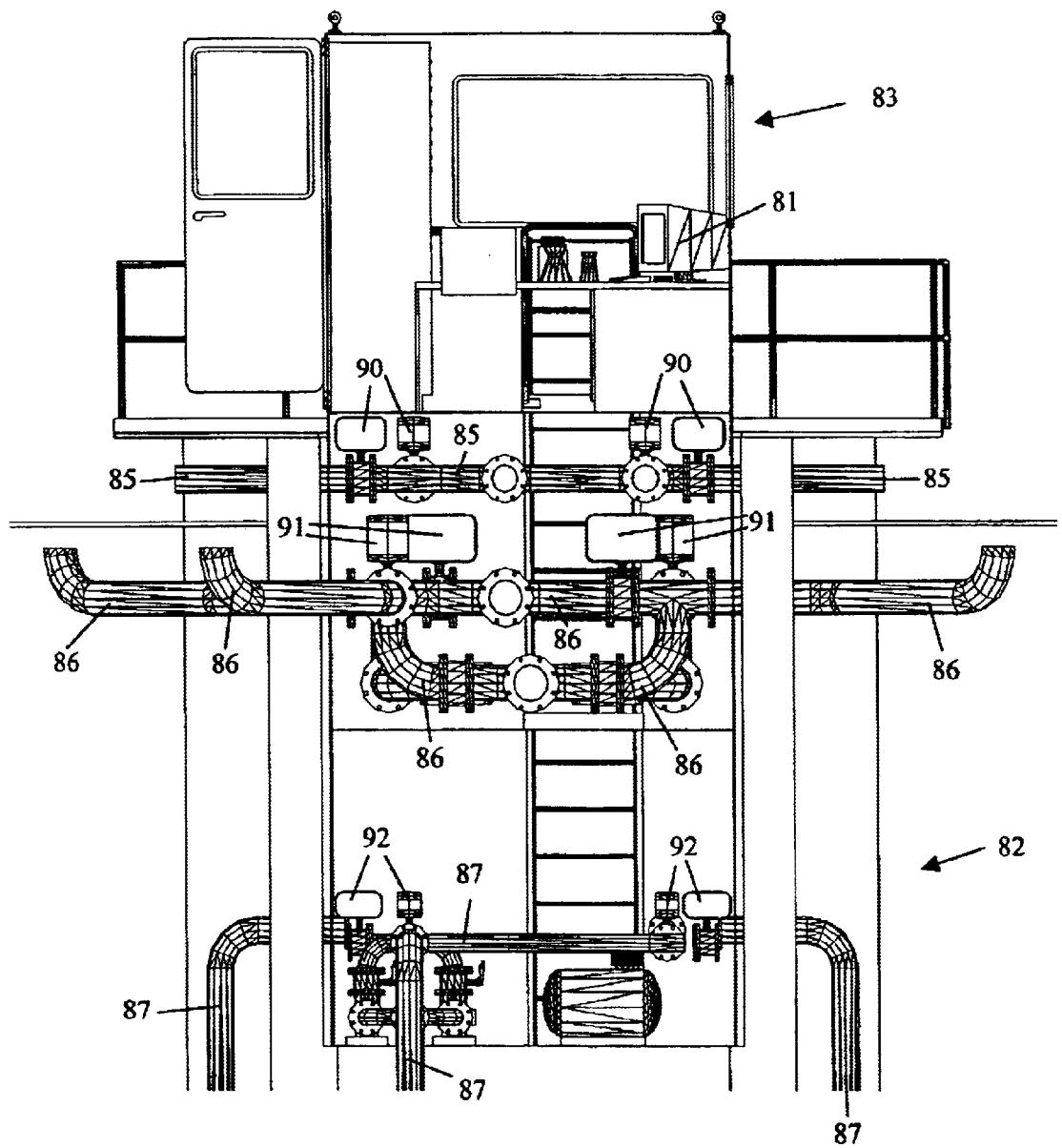

The said core infrastructure is always delivered as a complete package, comprising a central connecting infrastructure 80 and monitoring and control equipment 81, as represented in FIG. 7a and FIG. 7b.

The central connecting infrastructure 80 is functionally separated into two levels. A down floor part forms the central connecting room 82 and the top floor part is the monitoring and control room 83 including process laboratories.

Typical internals of the central connecting room 82 are:

Interconnecting piping, an influent distribution system 85, an effluent collection system 86, a sludge collection system 87, and an air distribution system 88

Influent, effluent, sludge and air related valves, e.g. automatic normally closed valves 90 for influent, automatic normally closed valves 91 for effluent, automatic normally closed valves 92 for sludge Sampling piping (not represented).

Sludge waste pump in case of small systems

Small equipment like a compressor in case of pneumatic valves

Figure 8:
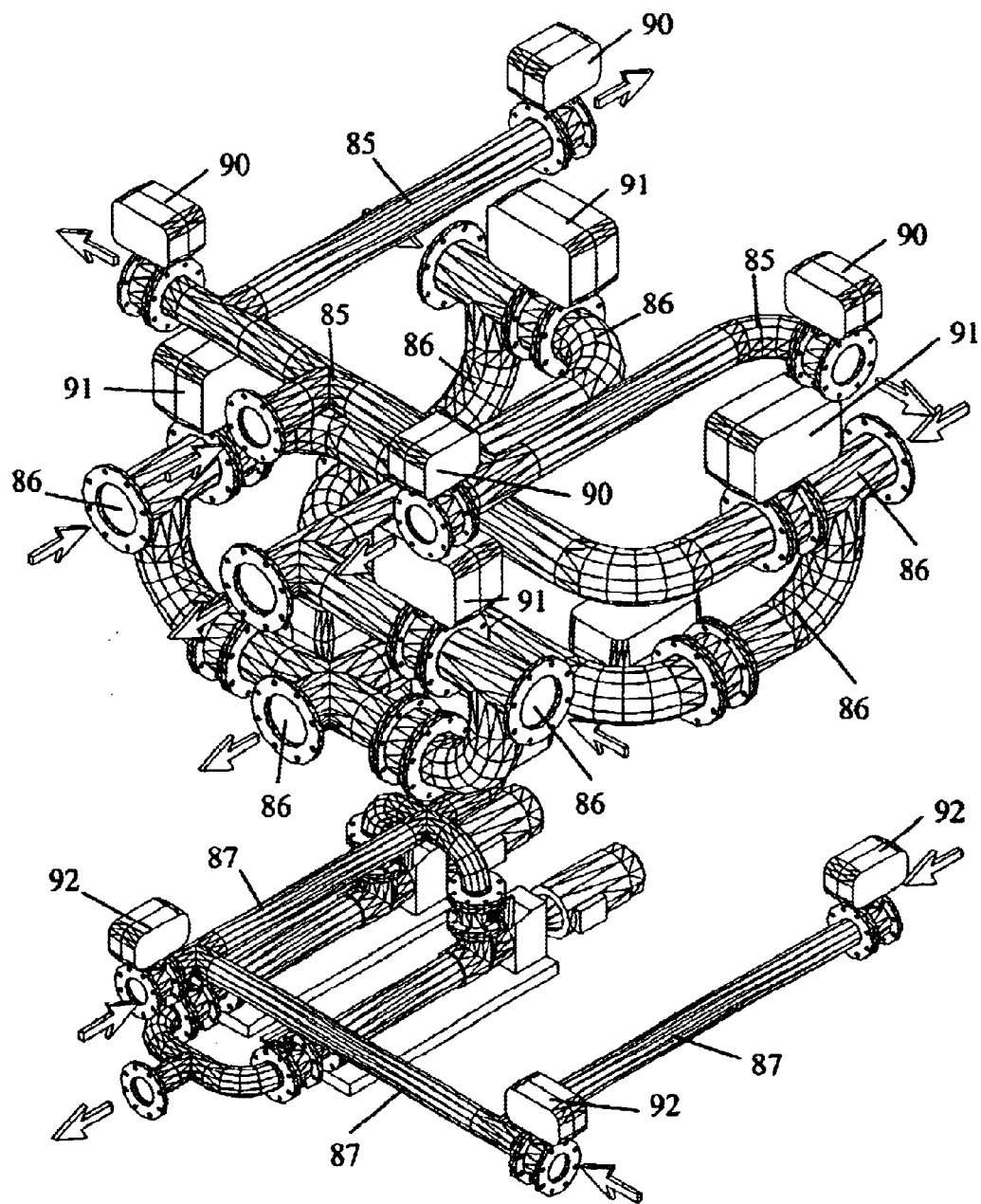
FIG. 8 shows details of the interconnecting piping in the core connecting infrastructure of FIG. 7.

The central connecting room takes care for all hydraulic connections needed for the symmetric cyclic operation of the said 4-unit and 3-unit embodiments. A typical arrangement of the internals are shown in FIG. 7a, FIG. 7b and FIG. 8.

From the control room 83 of the core connecting infrastructure 80, an operator 95 has a panoramic overview of the system for visual inspection. The room 83 contains all the monitoring and control arrangements, such as:

a low tension panel for core equipment a control unit (PLC, PC, etc.)

functional cycle control software a central intelligent sensor a process control laboratory The arrangements take care for the complete monitoring and control of the 4-unit and 3-unit embodiments. The arrangement integrates all essential control information from inside and outside the said core connecting infrastructure. Information from within said core connecting infrastructure is e.g. the status of he cyclic operation, the status and data of the intelligent sensor, or an operator input. Information from outside said core connecting infrastructure may e.g. be the status and data from pre-treatment or post-treatment units, the status and data from an external power panel (motor or equipment status), or status and data from equipment sensors (e.g. leak detection).

The said core connecting infrastructure is connected with an externally placed power panel from where the electro-mechanical equipment is powered. Essential communication channels between the external units and the said core embodiment are according to core connecting infrastructure standards.

While the invention has been shown and described with reference to preferred embodiments, it will be understood by those skilled in the art that various changes or modifications in form and detail may be made without departing from the scope and spirit of this invention.

What is claimed is:

1. A continuous flow, constant level, activated sludge process for treating wastewater, comprising, in a first phase of operation:
   (a) continuously receiving wastewater into a first compartment (A) where it mixes with sludge received from a subsequent compartment of the series, the series comprising at least three fluidly linked compartments,
   (b) passing the wastewater-sludge mixture along the series of compartments from the first compartment (A) of the series through at least one subsequent compartment (B, C) of the series where internal substrates are further metabolised,
   (c) passing the metabolised wastewater-sludge mixture to a current last compartment (D) of the series where biomass is separated from effluent,
   (d) discharging effluent from the current last compartment (D),
   (e) preparing a compartment (A, B, C) of the series to become a new last compartment (A,B,C) for separation of biomass and effluent in a new phase of operation, by temporarily stopping circulation to and from this compartment (A,B,C), this compartment (A,B,C) not being the current last compartment (D) while discharging from the current last compartment (D) and receipt of the waste water into the compartment is maintained during the preparation step to provide continuous flow,
   (f) repeating steps (a) to (e) in the new operating phase, whereby all compartments (A, B, C, D) of the first phase become a series of fluidly linked compartments in the new phase with the new last compartment being used for separation of biomass and effluent,
   (g) repeating step (f) to rotatively cycle the operation of the compartments.

2. A process according to claim 1, wherein the at least one subsequent compartment (B, C, D) comprises at least a last subsequent compartment (C), the wastewater-sludge mixture from the last subsequent compartment (C) is passed in step (c) to the current last compartment (D), and the last subsequent compartment (C) is prepared in step (e) to become the last separation compartment in the new phase of operation.

3. An activated sludge wastewater process for treating wastewater according to claim 1,
   wherein in step (e) sludge transport is through compartments, other then the compartment (C) being prepared, in a reverse direction.

4. A process according to claim 1, wherein the first compartment (A) is prepared in step (e) to become the last separation compartment in the new phase of operation.

5. A process according to claim 4, wherein in step (e) sludge transport is through compartments other than the compartment (A) being prepared in the same direction.

6. A process according to claim 1, characterised in that it furthermore comprises the step of discharging biosolids from the last compartment (D).

7. A process according to claim 1, characterised in that the wastewater-sludge mixture is treated aerobically, anaerobically, or anoxically in all active compartments, being all compartments (A, B, C) but the last compartment.

8. A process according to claim 7, characterised in that in at least one active compartment, during at least part of a phase, alternates between aerobic and anaerobic or anoxic states.

9. A process according to claim 1, characterised in that biomass is separated from effluent by sedimentation.

10. A biological reactor comprising:
   (a) a series of at least three fluidly linked compartments,
   (b) means for continuously receiving wastewater into a first compartment
      (A) of the series where it mixes with sludge received from a subsequent compartment of the series,
   (c) means for passing the wastewater-sludge mixture along the series of compartments from the first compartment (A) of the series to the at least one subsequent compartment (B, C) of the series where internal substrates are further metabolised,
   (d) means for passing the metabolised wastewater-sludge mixture to a last compartment (D) of the series where biomass is separated from effluent,
   (e) means for discharging effluent from the current last compartment (D),
   (f) means for preparing a compartment (A,B,C) of the series which is not the current last compartment (D) to become a new last compartment (A,B,C) for separation of biomass from effluent in a new phase of operation, the means for preparing being adapted to temporarily stop circulation to and from the compartment (A,B,C) being prepared and to maintain discharge from the current last compartment (D) and receipt of waste water into a compartment to provide continuous flow, the compartment (A,B,C) being prepared not being the current last compartment (D) and,
   (g) control means for controlling the series of compartments in the new operating phase so that all compartments (A, B, C, D) of the first phase become a series of fluidly linked compartments in the new phase with the new last compartment being used for separation of biomass and effluent and all compartments follow the same symmetrical functional cycle of reaction and separation in a rotation cycle.

11. A biological reactor according to claim 10, wherein all the compartments are identical in equipment.

12. A biological reactor according to claim 10, wherein each compartment is filled up to a certain level, and the reactor is adapted to maintain the levels in the compartments substantially constant during activation and sedimentation.

13. A biological reactor according to claim 10, wherein the compartment to be prepared is the next adjacent upstream compartment to the last current compartment in the series.

14. A biological reactor according to claim 10, wherein the compartment to be prepared is the first compartment in the series.

15. A biological reactor according to claim 13, wherein the preparing means are adapted so that transport of sludge is through compartments other than the compartment (C) being prepared.

* * * * *